United States Patent
Lee et al.

(10) Patent No.: US 11,695,280 B2
(45) Date of Patent: Jul. 4, 2023

(54) ELECTRONIC DEVICE FOR MANAGING MULTIPLE BATTERIES CONNECTED IN SERIES AND METHOD FOR OPERATING SAME

(71) Applicant: Samsung Electronics Co., Ltd., Gyeonggi-do (KR)

(72) Inventors: Dongyoung Lee, Gyeonggi-do (KR); Kisun Lee, Gyeonggi-do (KR); Wooin Choi, Gyeonggi-do (KR); Byunghwa Park, Gyeonggi-do (KR)

(73) Assignee: Samsung Electronics Co, Ltd

( * ) Notice: Subject to any disclaimer, the term of this patent is extended or adjusted under 35 U.S.C. 154(b) by 191 days.

(21) Appl. No.: 17/104,641

(22) Filed: Nov. 25, 2020

(65) Prior Publication Data
US 2021/0167612 A1    Jun. 3, 2021

(30) Foreign Application Priority Data
Nov. 29, 2019  (KR) .................. 10-2019-0156435

(51) Int. Cl.
*H02J 7/00*   (2006.01)
*H02J 7/34*   (2006.01)

(52) U.S. Cl.
CPC ........ *H02J 7/0018* (2013.01); *H02J 7/00034* (2020.01); *H02J 7/007184* (2020.01); *H02J 7/345* (2013.01)

(58) Field of Classification Search
CPC .................................................. H02J 7/0018
USPC ......................................................... 320/161
See application file for complete search history.

(56) References Cited

U.S. PATENT DOCUMENTS

| | | | |
|---|---|---|---|
| 8,169,190 B2 | 5/2012 | Miyazaki et al. | |
| 2005/0077875 A1 | 4/2005 | Bohley | |
| 2015/0130471 A1 | 5/2015 | Bolduc | |
| 2016/0020621 A1 | 1/2016 | Baby et al. | |
| 2016/0226107 A1* | 8/2016 | Worry | H01M 10/4207 |
| 2017/0292997 A1* | 10/2017 | You | H01M 10/482 |
| 2017/0346334 A1 | 11/2017 | Mergener et al. | |
| 2018/0292853 A1* | 10/2018 | Jefremow | G05F 1/565 |
| 2019/0115769 A1 | 4/2019 | Chen et al. | |
| 2019/0222041 A1* | 7/2019 | Liu | H02J 7/00308 |

FOREIGN PATENT DOCUMENTS

WO    WO 2015/115766    8/2015

OTHER PUBLICATIONS

International Search Report dated Mar. 3, 2021 issued in counterpart application No. PCT/KR2020/016936, 3 pages.

* cited by examiner

*Primary Examiner* — Yalkew Fantu
(74) *Attorney, Agent, or Firm* — The Farrell Law Firm, P.C.

(57) ABSTRACT

An electronic device is provided. The electronic device includes a voltage divider circuit, a first battery electrically connected to a first point of the voltage divider circuit, and a second battery connected in series to the first battery. A second point different from the first point of the voltage divider circuit is electrically connected from a first node on an electric path through which the first battery and the second battery are electrically connected.

16 Claims, 25 Drawing Sheets

ELECTRONIC DEVICE FOR MANAGING MULTIPLE BATTERIES CONNECTED IN SERIES AND METHOD FOR OPERATING SAME

CROSS-REFERENCE TO RELATED APPLICATION(S)

This application is based on and claims priority under 35 U.S.C. 119 to Korean Patent Application No. 10-2019-0156435, filed on Nov. 29, 2019, in the Korean Intellectual Property Office, the entire disclosure of which is incorporated herein by reference.

BACKGROUND

1. Field

The present disclosure relates generally to an apparatus and a method for managing multiple batteries connected in series in connection with an electronic device.

2. Description of Related Art

In line with development of information/communication technologies and semiconductor technologies, various electronic device have been developed as multimedia devices providing various multimedia services. For example, the multimedia services may include at least one of a voice communication service, a message service, a broadcasting service, a wireless Internet service, a camera service, an electronic payment service, or a music playback service.

Each electronic device employs, as its power source, a battery having a limited power capacity in order to provide the user with portability and movability. The user of an electronic device, which employs a battery as its power source, can move out of the wired environment for powering the electronic device and thus use the electronic device more conveniently.

An electronic device may include at least one battery (e.g., a pack of batteries or a cell of batteries). An electronic device may include multiple batteries connected in series or in parallel.

An electronic device including multiple batteries connected in series may require an additional circuit for controlling the batteries. If an electronic device supplies power to a system through multiple batteries connected in series, the electronic device requires a voltage divider or a step-down converter for dropping the battery voltage to a predetermined level. The electronic device requires a balancing circuit for battery balancing such that no imbalance occurs in connection with charging/discharging of the multiple batteries.

SUMMARY

The present disclosure has been made to address at least the disadvantages described above and to provide at least the advantages described below.

In accordance with an aspect of the present disclosure, an electronic device is provided. The electronic device includes a voltage divider circuit, a first battery electrically connected to a first point of the voltage divider circuit, and a second battery connected in series to the first battery. A second point different from the first point of the voltage divider circuit is electrically connected from a first node on an electric path through which the first battery and the second battery are electrically connected.

In accordance with an aspect of the present disclosure, a method for operating an electronic device is provided. The method includes identifying voltages of a first battery and a second battery connected in series, and turning on a voltage divider circuit in case that a voltage difference between the first battery and the second battery satisfies a designated first condition, the voltage divider circuit having a first point connected to the first battery and having a second point which is different from the first point, connected to a first node on an electric path through which the first battery and the second battery are electrically connected.

In accordance with an aspect of the present disclosure, an electronic device is provided. The electronic device includes a first battery, a second battery connected in series to the first battery, a power management module configured to control charging and/or discharging of the first battery and the second battery, and a processor operatively connected to the power management module. The power management module comprises a voltage divider circuit having a first point connected to the first battery and having a second point, which is different from the first point, connected to a node on an electric path through which the first battery and the second battery are electrically connected. The processor is configured to turn on the voltage divider circuit in case that a voltage difference between the first battery and the second battery satisfies a designated condition.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Hereinafter, various embodiments will be described in detail with reference to the accompanying drawings.

Figure 1:
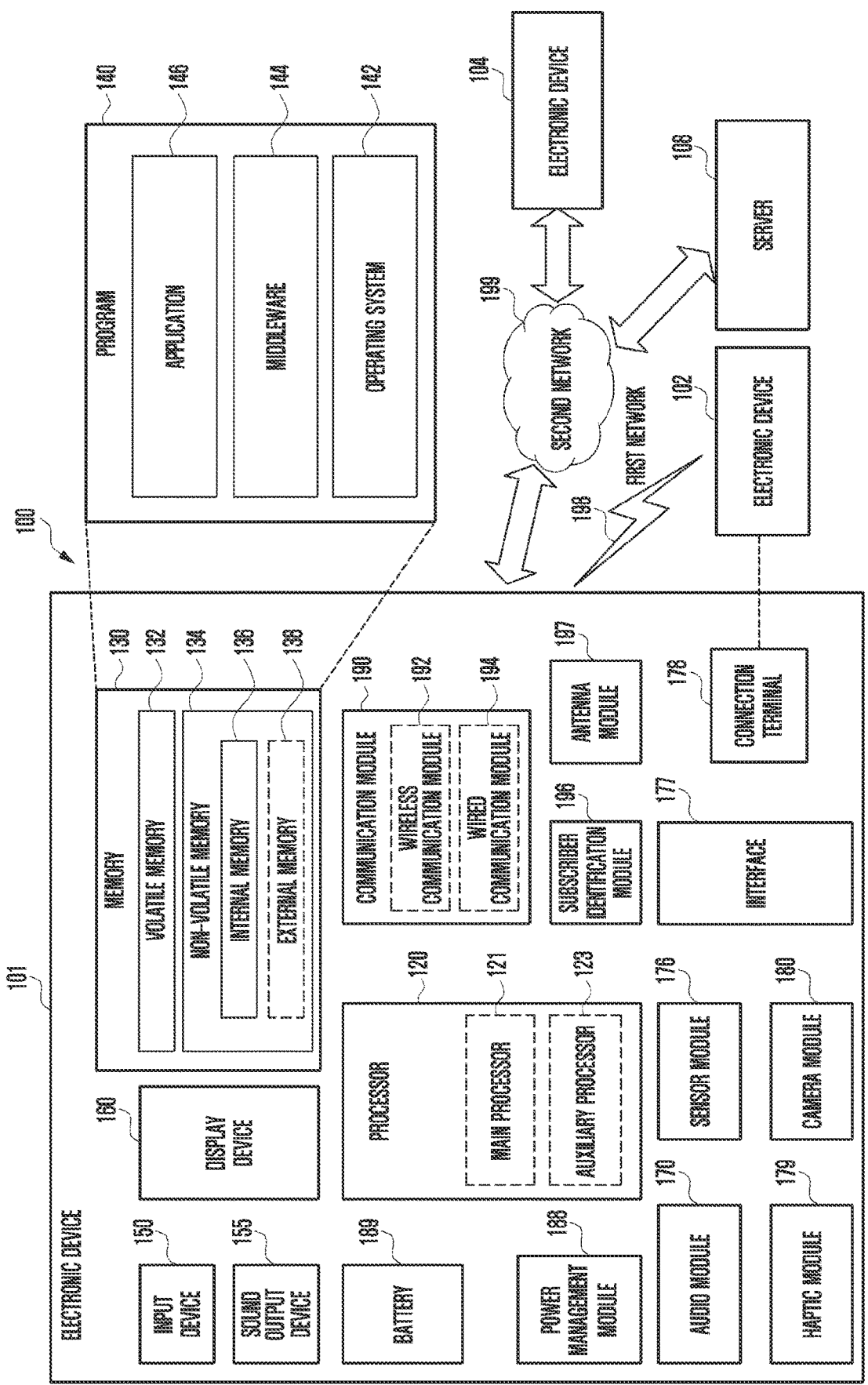
FIG. 1 is a block diagram of an electronic device inside a network environment, according to an embodiment.

FIG. 1 is a block diagram illustrating an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134, According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication.

According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas, in such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (MC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101, According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
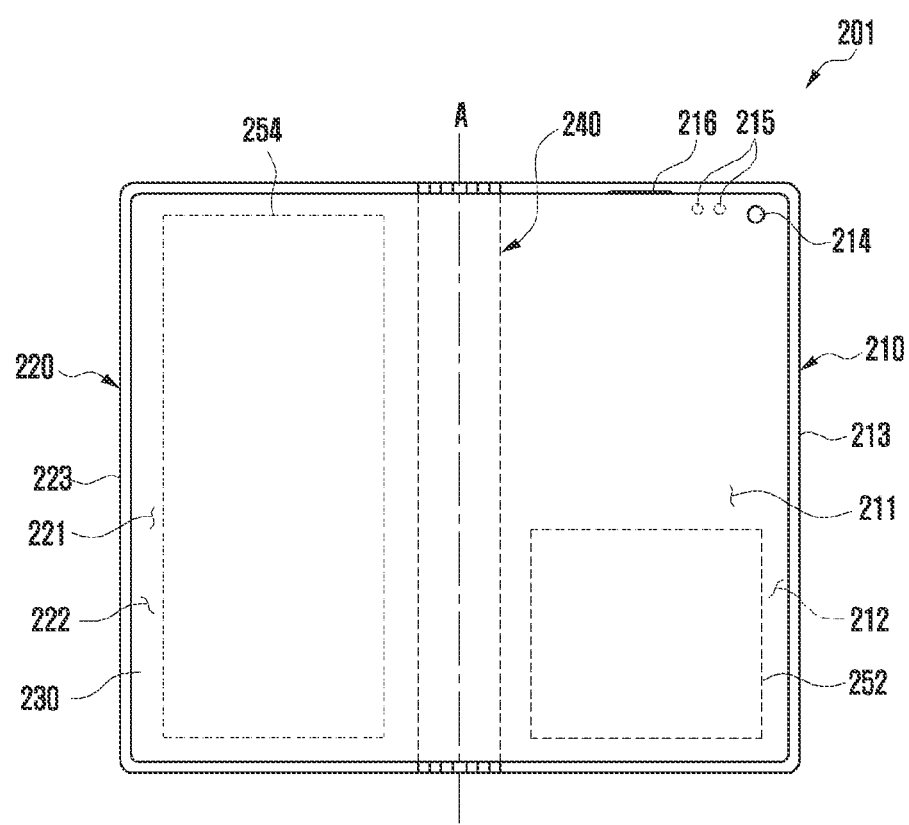
FIG. 2A is a diagram illustrating a foldable electronic device, according to an embodiment.

FIG. 2A is a diagram illustrating a foldable electronic device, according to an embodiment. The electronic device 201 in the following description may be the electronic device 101 in FIG. 1.

Referring to FIG. 2A, the electronic device 201 may include a pair of housing structures 210 and 220 (e.g., foldable housing structures) coupled to be able to rotate with reference to folding axis A (e.g., a folding axis in the vertical or horizontal direction) through a hinge structure 240 such that they are folded with regard to each other, and a display 230 (e.g., a flexible display or a foldable display) positioned in a space formed by the pair of housing structures 210 and 220. The surface on which the display 230 is positioned may be defined as the front surface of the electronic device 201, and the opposite surface of the front surface may be defined as the rear surface of the electronic device 201. In addition, a surface surrounding the space between the front and rear surfaces may be defined as a side surface of the electronic device 201.

The pair of housing structures 210 and 220 may include a first housing structure 210 and a second housing structure 220. The pair of housing structures 210 and 220 of the electronic device 201 is not limited to the type and coupling illustrated in FIG. 2A, and may be implemented by a combination and/or coupling of other shapes or components.

The first housing structure 210 and the second housing structure 220 may be positioned on both sides around the folding axis (axis A), and may have overall shapes symmetric with regard to the folding axis (axis A). The angle or distance between the first housing structure 210 and the second housing structure 220 may vary depending on whether the electronic device 201 is in a flat state, in a folding state, or in an intermediate state.

The first housing structure 210 may include an area in which a camera 214 and various sensors 215 are positioned, unlike the second housing structure 220, but other areas thereof may have mutually symmetric shapes. The area in which a camera 214 and various sensors 215 are positioned may be additionally positioned in at least a partial area of the second housing structure 220 or may be replaced.

The first housing structure) may include a first surface 211 connected to the hinge structure 240 and positioned to face the front surface of the electronic device 201, in the flat state of the electronic device 201, a second surface 212 facing away from the first surface 211 and a first side member 213 surrounding at least a part of the space between the first surface 211 and the second surface 212.

The second housing structure 220 may include a third surface 221 connected to the hinge structure 240 and positioned to face the front surface of the electronic device 201 in the flat state of the electronic device 201, a fourth surface 222 facing away from the third surface 221, and a second side member 223 surrounding at least a part of the space between the third surface 221 and the fourth surface 222. The first surface 211 may be configured to face the third surface 221 in an infolding-type folding state. The second surface 212 may be configured to face the fourth surface 222 in an outfolding-type folding state.

The camera 214 and the sensors 215 may be positioned in a predetermined area on a corner of the first housing structure 210. However, the position of the camera 214 and the sensors 215 is not limited to the illustrated example. The camera 214 and the sensors 215 may be positioned in at least a partial area of the second housing structure 220. The camera 214 and the sensors 215 may be positioned in at least a partial area of the first housing structure 210 and the second housing structure 220.

The camera 214 may be exposed to the front surface of the electronic device 201 through an opening provided in a corner of the first housing structure 210. The camera 214 may be positioned at the lower end of at least a partial area of the display 230.

The sensors 215 may be positioned at the lower end of at least a partial area of the display 230. The sensors 215 may include at least one of a proximity sensor, an illuminance sensor, an iris recognition sensor, an ultraviolet sensor, or an indicator. The sensors 215 may be exposed to the front surface of the electronic device 201 through an opening provided in a corner of the first housing 210. The first housing structure 210 may include a receiver 216 positioned through at least a partial area, and an interface connector port 217.

The first housing structure 210 and the second housing structure 220 may provide, through an intercoupled structure, a space in which various components of the electronic device 201 (e.g., a printed circuit board, an antenna module, a sensor module, or a battery) can be positioned. One or more components may be positioned on the rear surface of the electronic device 201, or may be visually exposed therethrough. One or more components or sensors may be visually exposed through the rear surface 222 of the second housing structure 220. The sensors may include a proximity sensor, a rear camera device, and/or a flash. At least a part of a sub-display may be visually exposed through the rear surface 222 of the second housing structure 220.

The display 230 may be positioned in a space formed by the pair of housing structures 210 and 220. The display 230 may be seated in a recess formed by the pair of housing structures 210 and 220, and may be positioned to occupy substantially the majority of the front surface of the electronic device 201. Accordingly, the front surface of the electronic device 201 may include a display 230, and a partial area a boundary area) of the first housing structure 210 and a partial area (e.g., a boundary area) of the second housing structure 220, which are adjacent to the display 230. Multiple displays 230 may be configured. Some displays 230 may be positioned on the first housing structure 210, and other displays 230 may be positioned on the second housing structure 220.

The electronic device 201 may include a first battery 252 (e.g., a pack of batteries or a cell of batteries) positioned on at least a part of the first housing structure 210 and a second battery 254 (e.g., a pack of batteries or a cell of batteries) positioned on at least a part of the second housing structure 220. The first battery 252 and the second battery 254 may be connected in series. At least one of the type or capacity (or maximum capacity) of the first battery 252 and the second battery 254 may be identical or different.

The electronic device 201 may include multiple housings (e.g., first to third housings) positioned to be able to rotate with regard to each other. The first housing and the second housing may be connected to be able to rotate with regard to each other with reference to a first axis of rotation through a first hinge module. The first housing and the third housing may be connected to be able to rotate with regard to each other with reference to a second axis of rotation through a second hinge module. The second housing may be coupled to one side of the first housing through the first hinge module, and the third housing may be coupled to the other side of the first housing through the second hinge module. The first housing, the second housing, and/or the third housing may include a battery positioned on at least a part thereof. Batteries positioned on the housings may be connected in series.

Figure 2B:
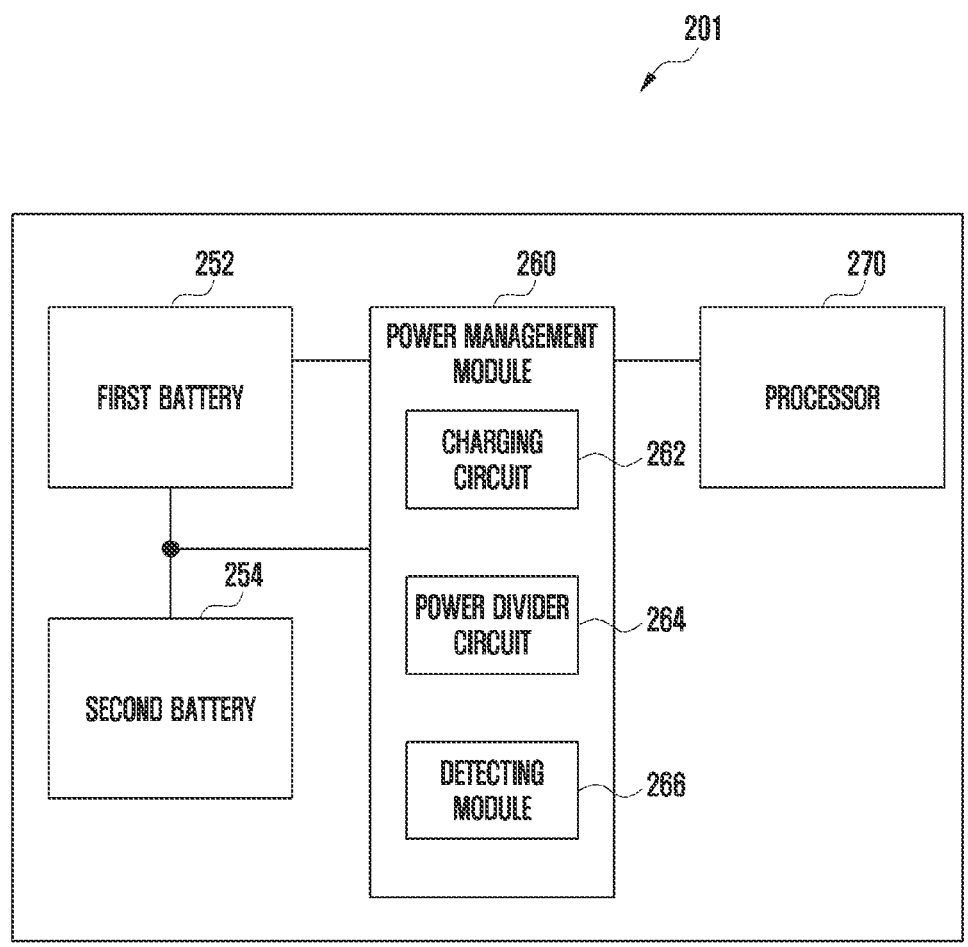
FIG. 2B is a block diagram of an electronic device for controlling the charging/discharging of batteries, according to an embodiment.
Figure 3:
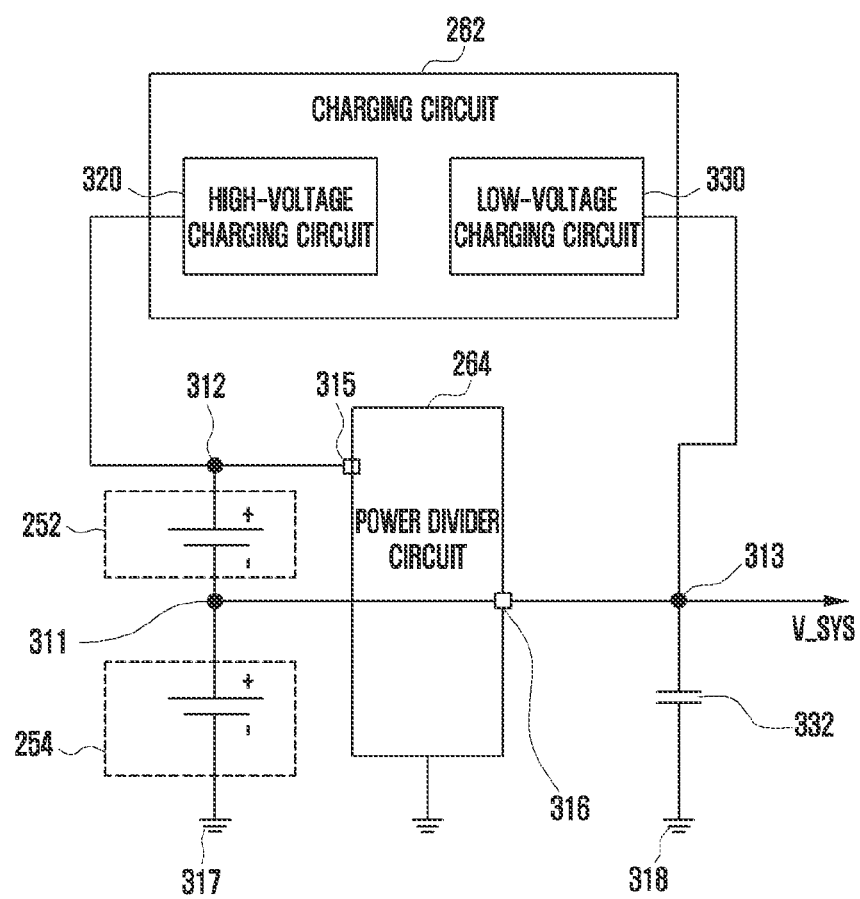
FIG. 3 illustrates a configuration for discharging/discharging batteries, according to an embodiment.

FIG. 2B is a block diagram of an electronic device for controlling the charging/discharging of batteries, according to an embodiment. In the following description, the electronic device 201 may include at least some of the components of the electronic device 101 in FIG. 1. At least some components in FIG. 2B may hereinafter be described with reference to FIG. 3. FIG. 3 illustrates a configuration for discharging/discharging batteries, according to an embodiment.

Referring to FIG. 2B, the electronic device 201 may include batteries 252 and 254, a power management module 260, and a processor 270. The batteries 252 and 254 may be identical to the battery 189 in FIG. 1 or may be included in the battery 189. The power management module 260 may be identical to the power management module 188 in FIG. 1 or may be included in the power management module 188. The processor 270 may be identical to the main processor 121 in FIG. 1 or may be included in the main processor 121. The processor 270 may include an AP, a sensor hub processor, or a micro controller unit (MCU) processor.

The batteries 252 and 254 may be connected in series. At least one of the type or capacity (or maximum capacity) of the first battery 252 and the second battery 254 may be identical or different. The second battery 254 may be configured to have a capacity relatively larger than or equal to that of the first battery 252. The first battery 252 may be electrically connected to a first node 311 and a second node 312 as in FIG. 3. The second battery 254 may be electrically connected between the first node 311 and a first ground unit 317. The first node 311 may be included in an electric path through which the first battery 252 and the second battery 254 are connected in series. The second node 312 may be included in an electric path through which a first point 315 of a voltage divider circuit 264 is connected to a first pole (e.g., pole) of the first battery 252.

The power management module 260 may include a charging circuit 262, a voltage divider circuit 264, and/or a detecting module 266. The charging circuit 262 may charge the batteries 252 and/or 254 by using power supplied from an external power source. The power management module 260 (or the processor 270) may select a charging scheme (e.g., normal charging, direct charging, or rapid charging) based on at least one of the type of the external power source (e.g., a power adapter, a USB, or wireless charging), the amount of power suppliable from the external power source (e.g., travel adapter (TA) or an external electronic device), or the attribute of the batteries 252 and/or 254. The charging circuit 262 may charge the batteries 252 and/or 254 by using the high-voltage charging circuit 320 or the low-voltage charging circuit (or normal charging circuit) 330 in FIG. 3, based on the charging scheme. The high-voltage charging circuit 320 may be electrically connected to the second node 312 connected to the first battery 252, as in FIG. 3. The low-voltage charging circuit 330 may be electrically connected to the third node 313, as in FIG. 3. A capacitor 332 is positioned between the third node 313 and a second ground unit 318 so as to remove noise or high-frequency signals from power applied to the batteries 252 and/or 254, and may include a bypass capacitor or a decoupling capacitor. The high-voltage charging circuit 320 and the lower-voltage charging circuit 330 may control charging of the batteries 252 and/or 254 according to a constant current (CC) scheme and/or a constant voltage (CV) scheme, based on the charging state of the batteries 252 and/or 254.

The voltage divider circuit 264 may adjust the voltage level of power supplied from the external power source or the batteries 252 and/or 254 into a voltage level appropriate for components included in the electronic device 201. The voltage divider circuit 264 may control balancing of the first battery 252 and the second battery 254. The first point 315 of the voltage divider circuit 264 may be electrically connected to the second node 312, as in FIG. 3. The second point 316 of the voltage divider circuit 264 may be connected to the first node 311 and the third node 313, as in FIG. 3. The first point 315 and the second point 316 of the voltage divider circuit 264 may differ from each other.

The detecting module 266 may identify (or measure) use state information of the batteries 252 and/or 254. The detecting module 266 may identify the voltage of the first battery 252 and the second battery 254.

The processor 270 may control the voltage divider circuit 264 based on a voltage difference between the first battery 252 and the second battery 254 identified through the detecting module 266. If the voltage difference between the first battery 252 and the second battery 254 exceeds a first reference voltage (e.g., about 100 mV), the processor 270 may control the voltage divider circuit 264 so as to operate in a first mode in which the voltage divider circuit 264 is turned on. If the voltage difference between the first battery 252 and the second battery 254 drops below a second reference voltage (e.g., about 60 mV) while the voltage divider circuit 264 operates in the first mode, the processor 270 may control the voltage divider circuit 264 so as to operate in a second mode in which at least a part of the voltage divider circuit 264 is turned on. If the voltage difference between the first battery 252 and the second battery 254 drops below a third reference voltage (e.g., about 20 mV) while the voltage divider circuit 264 operates in the second mode, the processor 270 may control the voltage divider circuit 264 so as to operate in a third mode in which the switching cycle of the voltage divider circuit 264 is adjusted. The switching cycle may include a cycle at which a transistor is turned on so as to connect the capacitor of the voltage divider circuit 264 and the first battery 252 or the second battery 254.

The processor 270 may differently configure a reference related to switching of the operating mode of the voltage divider circuit 264, in order to prevent frequent switching of the operating mode of the voltage divider circuit 264. The processor 270 may differently configure a reference (e.g., about 60 mV) when switching from the first mode to the second mode and a reference (e.g., about 80 mV) when switching from the second mode to the first mode. The processor 270 may differently configure a reference (e.g., about 20 mV) when switching from the second mode to the third mode and a reference (e.g., about 40 mV) when switching from the third mode to the second mode.

The processor 270 may adjust the magnitude (or value) of on-resistance (RDson resistance) of a transistor constituting the voltage divider circuit 264, in order to reduce a ripple current (or inrush current) resulting from switching of the voltage divider circuit 264. If the voltage difference between the first battery 252 and the second battery 254 exceeds a reference voltage (e.g., about 200 mV), the processor 270 may control the voltage divider circuit 264 such that the on-resistance of the transistor is configured to have a first value (e.g., about 25 mΩ). If the voltage difference between the first battery 252 and the second battery 254 is equal to/lower than the reference voltage, the processor 270 may control the voltage divider circuit 264 such that the on-resistance of the transistor is configured to have a second value (e.g., about 10 mΩ). Configuring the on-resistance may include an operation of selecting a sub-divider circuit from a sub-divider circuit including a first value and a sub-divider circuit including a second value. Configuring the on-resistance may include an operation of changing the value of a variable resistance corresponding to the transistor. Switching the voltage divider circuit 264 may include an operation of changing the battery 252 or 254 connected to the voltage divider circuit 264 such that the voltage divider circuit 264 balances the batteries 252 and 254.

At least some of the functions of the processor 270 may be performed by an external control device the power management module 260).

Figure 4A:
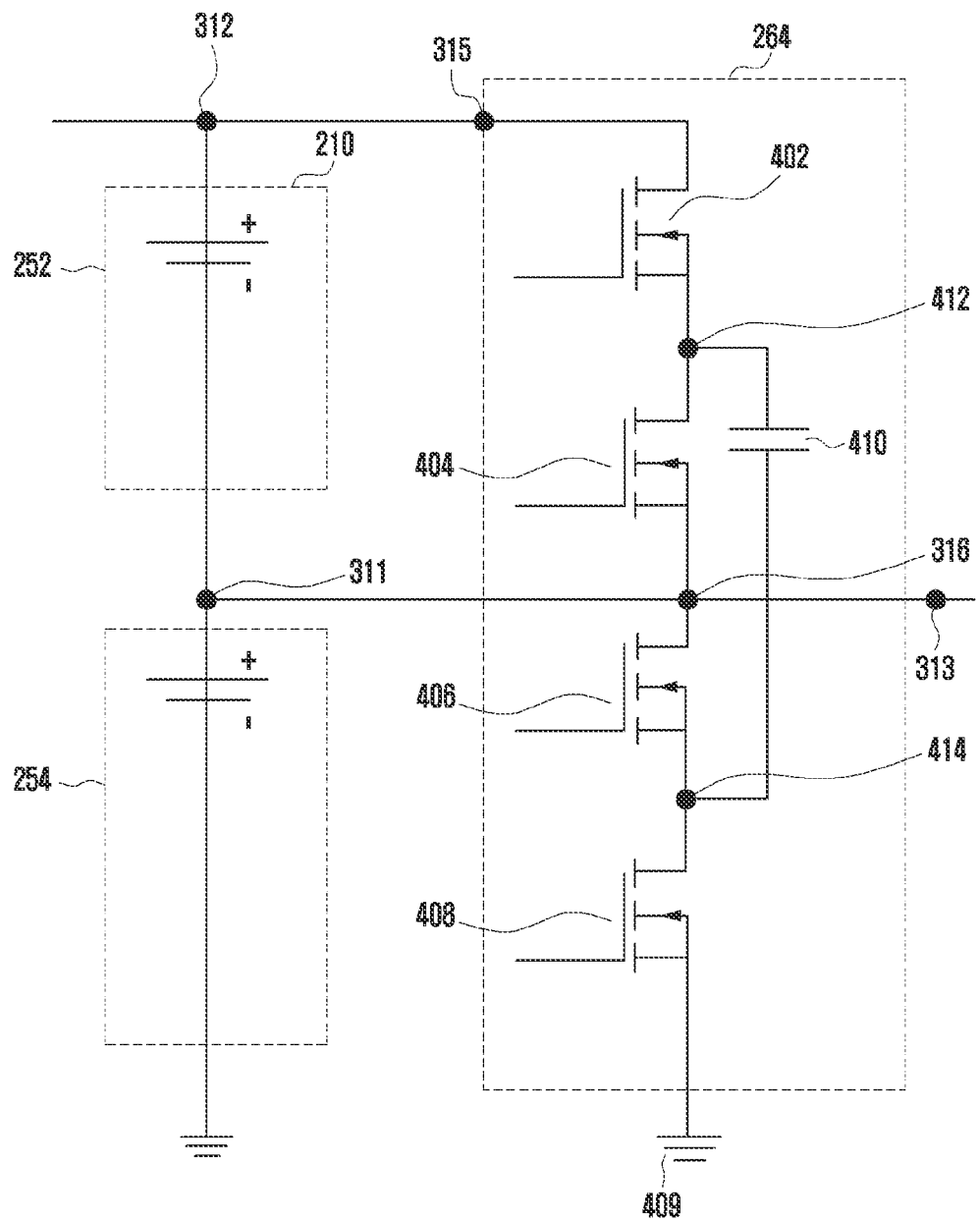
FIG. 4A illustrates the configuration of a voltage divider circuit, according to an embodiment.
Figure 4B:
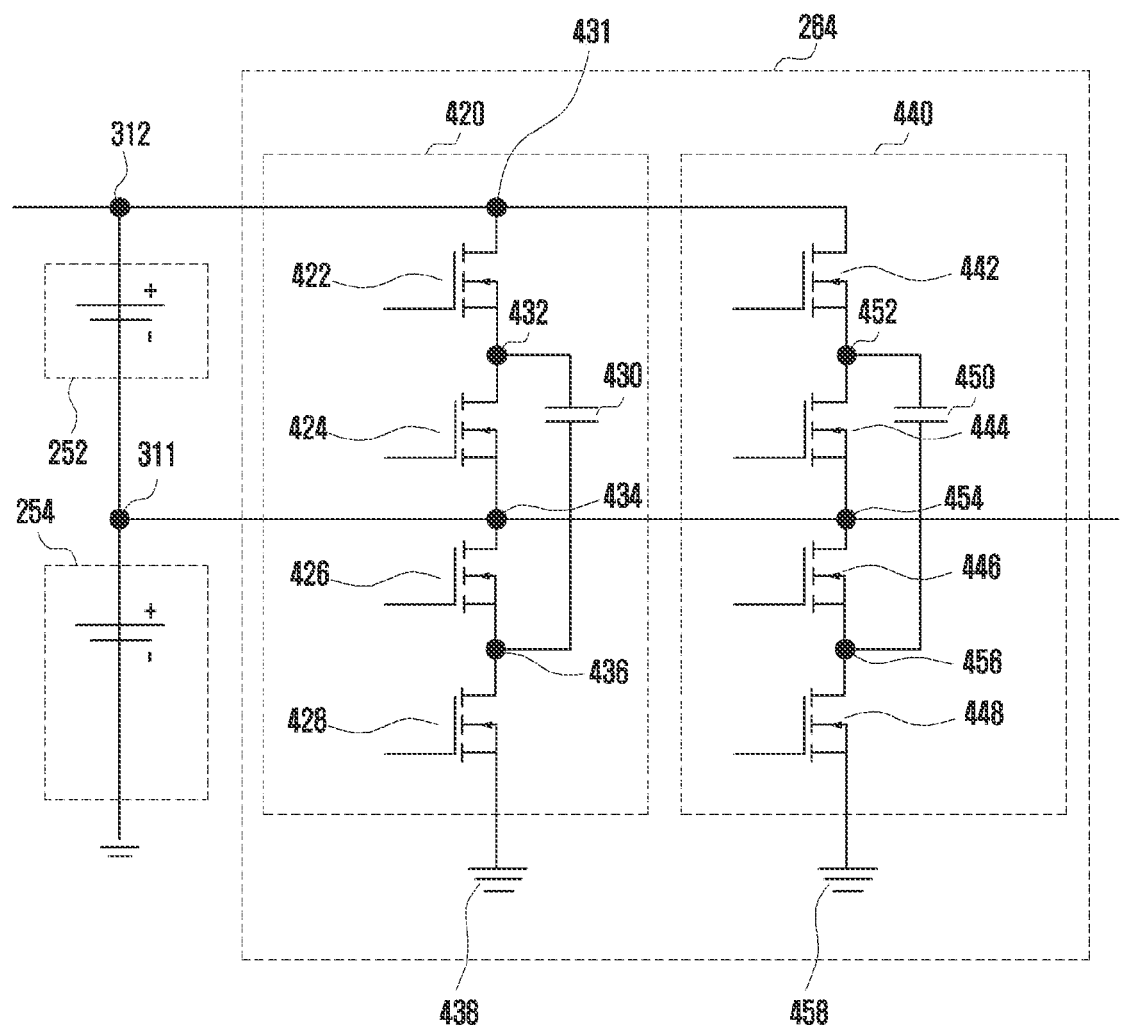
FIG. 4B illustrates the configuration of a voltage divider circuit, according to an embodiment.
Figure 4C:
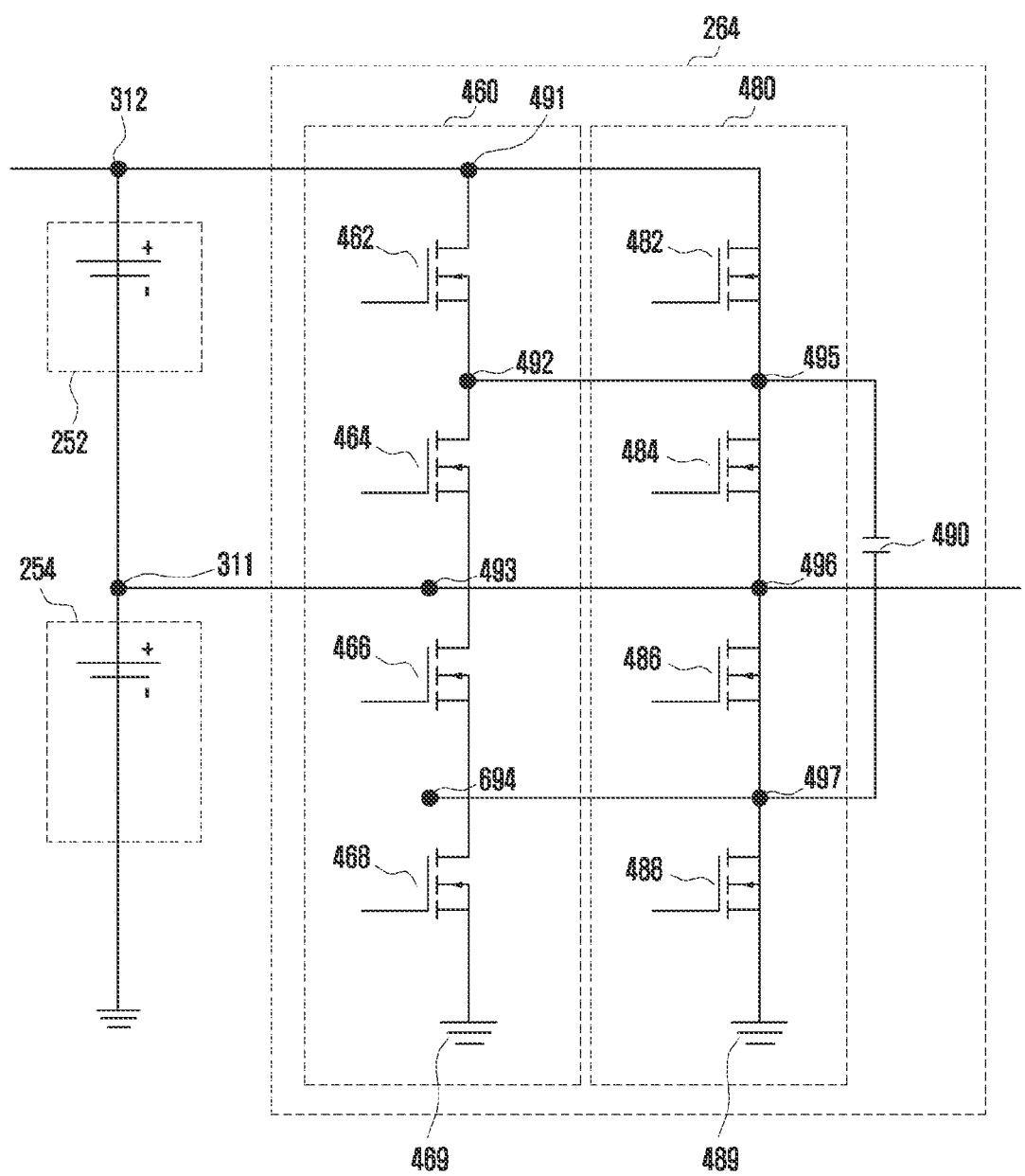
FIG. 4C illustrates the configuration of a voltage divider circuit, according to an embodiment.

FIG. 4A illustrates the configuration of a voltage divider circuit, according to an embodiment. FIG. 4B illustrates the configuration of a voltage divider circuit, according to an embodiment. FIG. 4C illustrates the configuration of a voltage divider circuit, according to an embodiment. The following descriptions may include internal components of the voltage divider circuit 264 in FIG. 2B.

Referring to FIG. 4A, the voltage divider circuit 264 may include a first transistor 402, a second transistor 404, a third transistor 406, a fourth transistor 408, and a first capacitor 410.

The first transistor 402, the second transistor 404, the third transistor 406, and the fourth transistor 408 may be connected in series. The first transistor 402 may be electrically connected between a second node 312 and a fourth node 412. The second transistor 404 may be electrically connected between a second point 316 between the second transistor 404 and the third transistor 406 and a fourth node

412. The third transistor 406 may be electrically connected between the second point 316 and a fifth node 414. The fourth transistor 408 may be electrically connected between the fifth node 414 and a ground unit 409. The second point 316 of the voltage divider circuit 264 may be included in an electric path through which the first node 311 and the third node 313 are electrically connected. The first transistor 402 and the third transistor 406 may be turned on at a first point in time as a pair. The second transistor 404 and the fourth transistor 408 may be turned on at a second point in time different from the first point in time as a pair. The first point in time and the second point in time may be alternately repeated at a predetermined cycle. The first transistor 402, the second transistor 404, the third transistor 406, or the fourth transistor 408 may include a metal oxide semiconductor field effect transistor (MOSFET).

The first capacitor 410 may be electrically connected between the fourth node 412 and the fifth node 414 such that the same is electrically connected to the first battery 252 or the second battery 254 based on turning-on of multiple transistors 402, 404, 406, or 408. The first capacitor 410 may be electrically connected to the first battery 252 if the pair of the first transistor 402 and the third transistor 406 is turned on. The first capacitor 410 may be electrically connected to the second battery 254 if the pair of the second transistor 404 and the fourth transistor 408 is turned on.

Referring to FIG. 4B, the voltage divider circuit 264 may include a first sub-divider circuit 420 and a second sub-divider circuit 440.

The first sub-divider circuit 420 may include a fifth transistor 422, a sixth transistor 424, a seventh transistor 426, an eighth transistor 428, and a second capacitor 430. The fifth transistor 422, the sixth transistor 424, the seventh transistor 426, and the eighth transistor 428 may be connected in series. The fifth transistor 422 may be electrically connected between a sixth node 431 and a seventh node 432. The sixth transistor 424 may be electrically connected between the seventh node 432 and an eighth node 434. The seventh transistor 426 may be electrically connected between the eighth node 434 and a ninth node 436. The eighth transistor 428 may be electrically connected between the ninth node 436 and a third ground unit 438. The second capacitor 430 may be electrically connected between the seventh node 432 and the ninth node 436 such that the same is electrically connected to the first battery 252 or the second battery 254 based on turning-on of multiple transistors 422, 424, 426, or 428. The second capacitor 430 may be electrically connected to the first battery 252 if the pair of the fifth transistor 422 and the seventh transistor 426 is turned on. The second capacitor 430 may be electrically connected to the second battery 254 if the pair of the sixth transistor 424 and the eighth transistor 428 is turned on.

The second sub-divider circuit 440 may include a ninth transistor 442, a tenth transistor 444, an eleventh transistor 446, a twelfth transistor 448, and a third capacitor 450. The ninth transistor 442, the tenth transistor 444, the eleventh transistor 446, and the twelfth transistor 448 may be connected in series. The ninth transistor 442 may be electrically connected between a sixth node 431 and a tenth node 452. The tenth transistor 444 may be electrically connected between the tenth node 452 and an eleventh node 454. The eleventh transistor 446 may be electrically connected between the eleventh node 454 and a twelfth node 156. The twelfth transistor 448 may be electrically connected between the twelfth node 456 and a fourth ground unit 458. The third capacitor 450 may be electrically connected between the tenth node 452 and the twelfth node 456 such that the same is electrically connected to the first battery 252 or the second battery 254 based on turning-on of multiple transistors 442, 444, 446, or 448. If the pair of the ninth transistor 442 and the eleventh transistor 446 is turned on, the third capacitor 430 may be electrically connected to the first battery 252. If the pair of the tenth transistor 444 and the twelfth transistor 448 is turned on, the third capacitor 430 may be electrically connected to the second battery 254. The second point 316 of the voltage divider circuit 264 may include the eighth node 434 and the eleventh node 454.

The first sub-divider circuit 420 and the second sub-divider circuit 440 may be driven for balancing of the first battery 252 and the second battery 254. If the processor 270 has determined an operation in the first mode, the voltage divider circuit 264 may turn on the first sub-divider circuit 420 and the second sub-divider circuit 440, thereby controlling the charging/discharging and balancing of the batteries 252 and/or 254. If the processor 270 has determined an operation in the second mode, the voltage divider circuit 264 may turn on the first sub-divider circuit 420 or the second sub-divider circuit 440, thereby controlling the charging/discharging and balancing of the batteries 252 and/or 254.

The first sub-divider circuit 420 and the second sub-divider circuit 440 may operate with opposite phases, in order to reduce the ripple current (or inrush current) resulting from switching of the voltage divider circuit 264. The first sub-divider circuit 420 may turn on the pair of the fifth transistor 422 and the seventh transistor 426 such that the first battery 252 and the second capacitor 430 are electrically connected. In this case, the second sub-divider circuit 440 may turn on the pair of the tenth transistor 444 and the twelfth transistor 448 such that the second battery 254 and the third capacitor 450 are electrically connected.

Referring to FIG. 4C, the voltage divider circuit 264 may include a third sub-divider circuit 460, a fourth sub-divider circuit 480, and a fourth capacitor 490.

The third sub-divider circuit 460 may include a thirteenth transistor 462, a fourteenth transistor 464, a fifteenth transistor 466, and a sixteenth transistor 468. The thirteenth transistor 462, the fourteenth transistor 464, the fifteenth transistor 466, and the sixteenth transistor 4688 may be connected in series. The thirteenth transistor 462 may be electrically connected between a thirteenth node 491 and a fourteenth node 492. The fourteenth transistor 464 may be electrically connected between the fourteenth node 492 and a fifteenth node 493. The fifteenth transistor 466 may be electrically connected between the fifteenth node 493 and a sixteenth node 494. The sixteenth transistor 468 may be electrically connected between the sixteenth node 494 and a fifth ground unit 469.

The fourth sub-divider circuit 480 may include a seventeenth transistor 482, an eighteenth transistor 484, a nineteenth transistor 486, and a twentieth transistor 488. The seventeenth transistor 482, the eighteenth transistor 484, the nineteenth transistor 486 and the twentieth transistor 488 may be connected in series. The seventeenth transistor 482 may be electrically connected between the thirteenth node 491 and a seventh node 495. The eighteenth transistor 484 may be electrically connected between the seventeenth node 495 and an eighteenth node 496. The nineteenth transistor 486 may be electrically connected between the eighteenth node 496 and a nineteenth node 497. The twentieth transistor 488 may be electrically connected between the nineteenth node 497 and a sixth ground unit 489. The second point 316 of the voltage divider circuit 264 may include the fifteenth node 493 and the eighteenth node 496.

The third sub-divider circuit 460 and the fourth sub-divider circuit 480 may be synchronized in order to share the fourth capacitor 490. The third sub-divider circuit 460 may turn on the pair of the thirteenth transistor 462 and the fifteenth transistor 466 such that the first battery 252 and the fourth capacitor 490 are electrically connected. In this case, the fourth sub-divider circuit 480 may turn on the pair of the seventeenth transistor 482 and the nineteenth transistor 486, similarly to the third sub-divider circuit 460, such that the first battery 252 and the fourth capacitor 490 are electrically connected.

The thirteenth transistor 462, the fourteenth transistor 464, the fifteenth transistor 466, and the sixteenth transistor 468, which are included in the third sub-divider circuit 460, and the seventeenth transistor 482, the eighteenth transistor 484, the nineteenth transistor 486, and the twentieth transistor 488, which are included in the fourth sub-divider circuit 480, may include different on-resistances (e.g., about 25 mΩ or about 10 mΩ). If the voltage difference between the first battery 252 and the second battery 254 exceeds a reference voltage (e.g., about 200 mV), the processor 270 may turn on the third sub-divider circuit 460 including an on-resistance having a first value (e.g., about 25 mΩ), in order to reduce the ripple current (or inrush current) resulting from switching of the voltage divider circuit 264. If the voltage difference between the first battery 252 and the second battery 254 is equal to/lower than a reference voltage (e.g., about 200 mV), the processor 270 may turn on the fourth sub-divider circuit 480 including an on-resistance having a second value (e.g., about 10 mΩ).

Figure 5A:
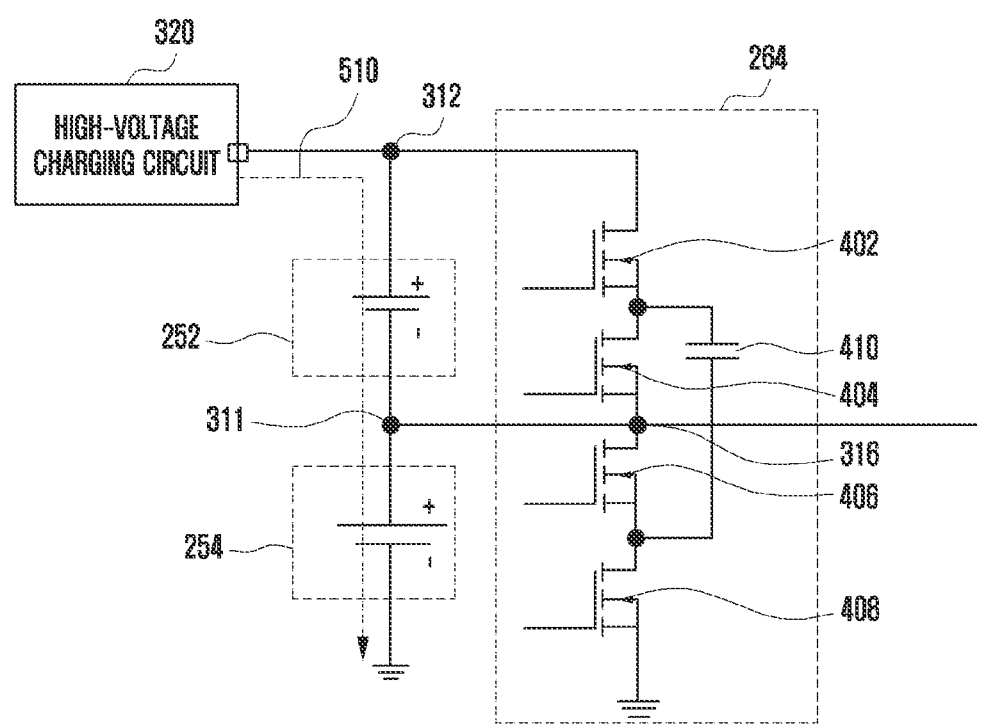
FIG. 5A illustrates a configuration for balancing batteries during high-voltage charging, according to an embodiment.
Figure 5B:
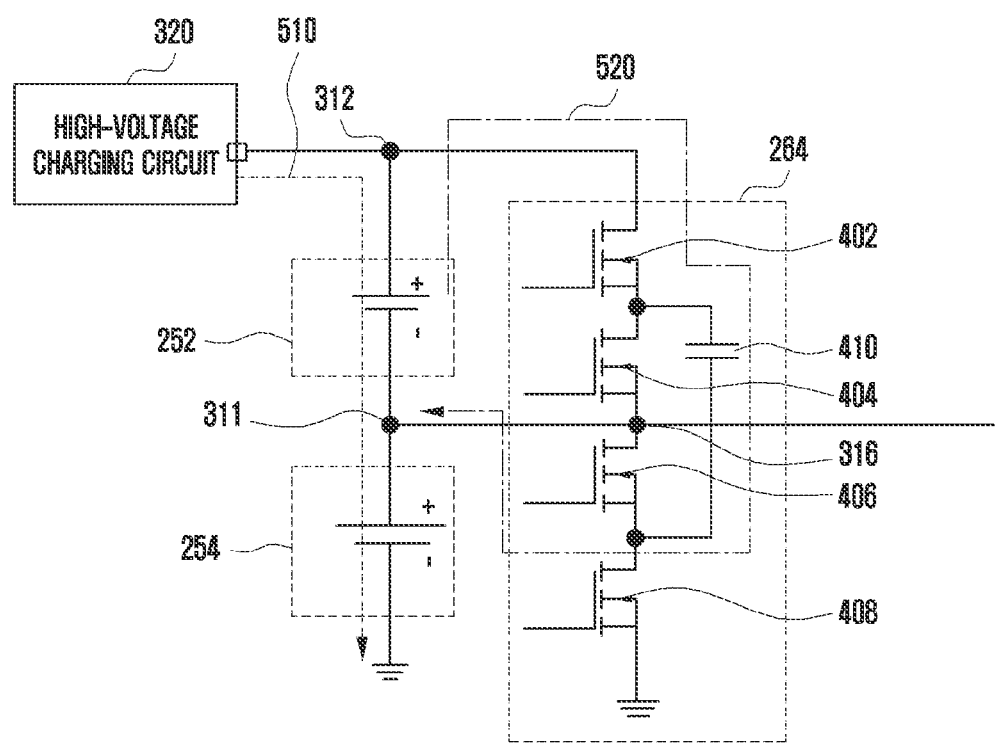
FIG. 5B illustrates a configuration for balancing batteries during high-voltage charging, according to an embodiment.
Figure 5C:
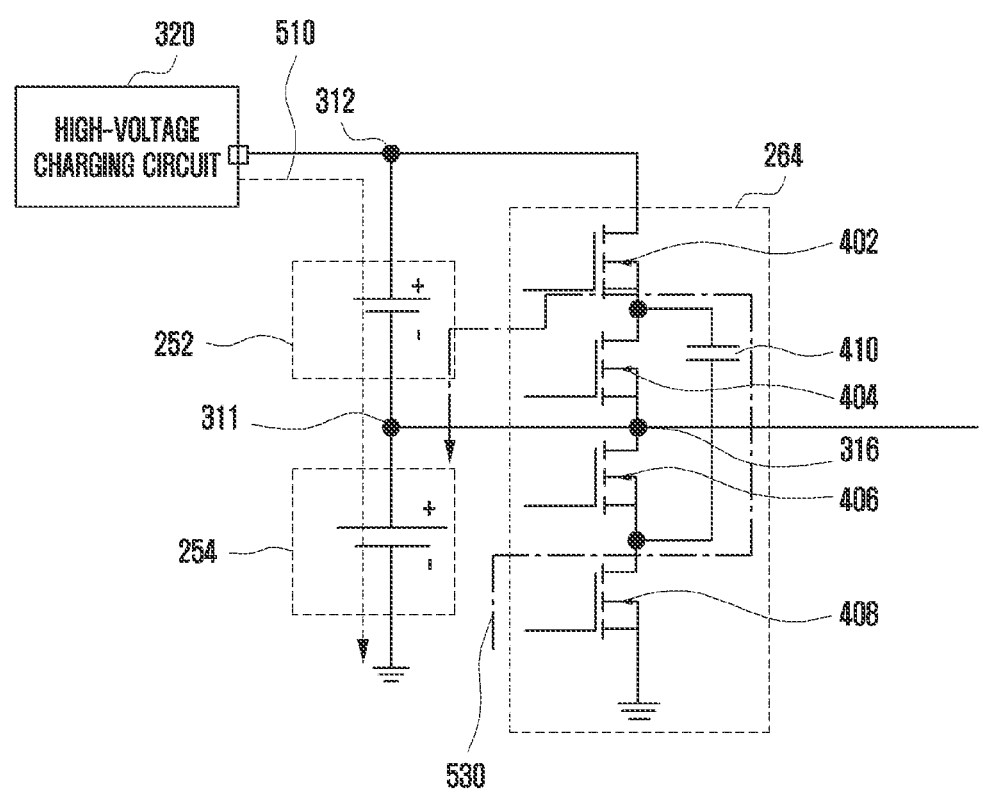
FIG. 5C illustrates a configuration for balancing batteries during high-voltage charging, according to an embodiment.

FIG. 5A illustrates a configuration for balancing batteries during high-voltage charging, according to an embodiment. FIG. 5B illustrates a configuration for balancing batteries during high-voltage charging, according to an embodiment. FIG. 5C illustrates a configuration for balancing batteries during high-voltage charging, according to an embodiment. It may be assumed in the following description that the capacity (or maximum capacity) of the first battery 252 is relatively smaller than that of the second battery 254.

Referring to FIG. 5A to FIG. 5C, the voltage divider circuit 264 may include a first transistor 402, a second transistor 404, a third transistor 406, a fourth transistor 408, and a first capacitor 410. In the following description, internal components of the voltage divider circuit 264 may operate similarly to the internal components of the voltage divider circuit 264 in FIG. 4A. The first transistor 402, the second transistor 404, the third transistor 406, the fourth transistor 408, and the first capacitor 410 in FIG. 5A to FIG. 5C may operate similarly to the first transistor 402, the second transistor 404, the third transistor 406, the fourth transistor 408, and the first capacitor 410 in FIG. 4A. For this reason, detailed descriptions of internal components of the voltage divider circuit 264 will be omitted herein.

When charging the batteries 252 and/or 254 according to a high-voltage charging scheme, the high-voltage charging circuit 320 may apply (510) a charging current to the first battery 252 and the second battery 254, as in FIG. 5A. The first battery 252 and the second battery 254 may be charged based on the charging current applied from the high-voltage charging circuit 320. If the capacity (or maximum capacity) of the first battery 252 is relatively smaller than that of the second battery 254, the first battery 252, even if charged with the same charging current, may maintain a relatively higher voltage than the second battery 254.

The processor 270 may turn on the voltage divider circuit 264 if the voltage difference between the first battery 252 and the second battery 254 exceeds a reference voltage (e.g., about 100 mV), based on high-voltage charging. The voltage divider circuit 264, if turned on by the processor 270, may alternately turn on a first pair of the first transistor 402 and the third transistor 406 and a second pair of the second transistor 404 and the fourth transistor 408.

If the first pair of transistors (e.g., the first transistor 402 and the third transistor 406) is turned on at a first point in time, the first capacitor 410 may be electrically connected to the first battery 252 through the first pair of transistors. The first capacitor 410, if connected to the first battery 252, may be charged (520) by a current provided from the first battery 252 having a voltage relatively higher than that of the second battery 254, as in FIG. 5B.

If a second pair of transistors (e.g., the second transistor 404 and the fourth transistor 408) is turned on at a second point in time, the first capacitor 410 may be electrically connected to the second battery 254 through the second pair of transistors. If the first capacitor 410 is connected to the second battery 254, energy accumulated by the first battery 252 may be provided to the second battery 254 having a voltage relatively lower than that of the first battery 252, as in FIG. 5C, thereby charging (530) the second battery 254. As a result, energy accumulated in the first battery 252 and the second battery 254, which has become unbalanced by the high-voltage charging circuit 320, may become uniform by means of the voltage divider circuit 264.

Figure 6A:
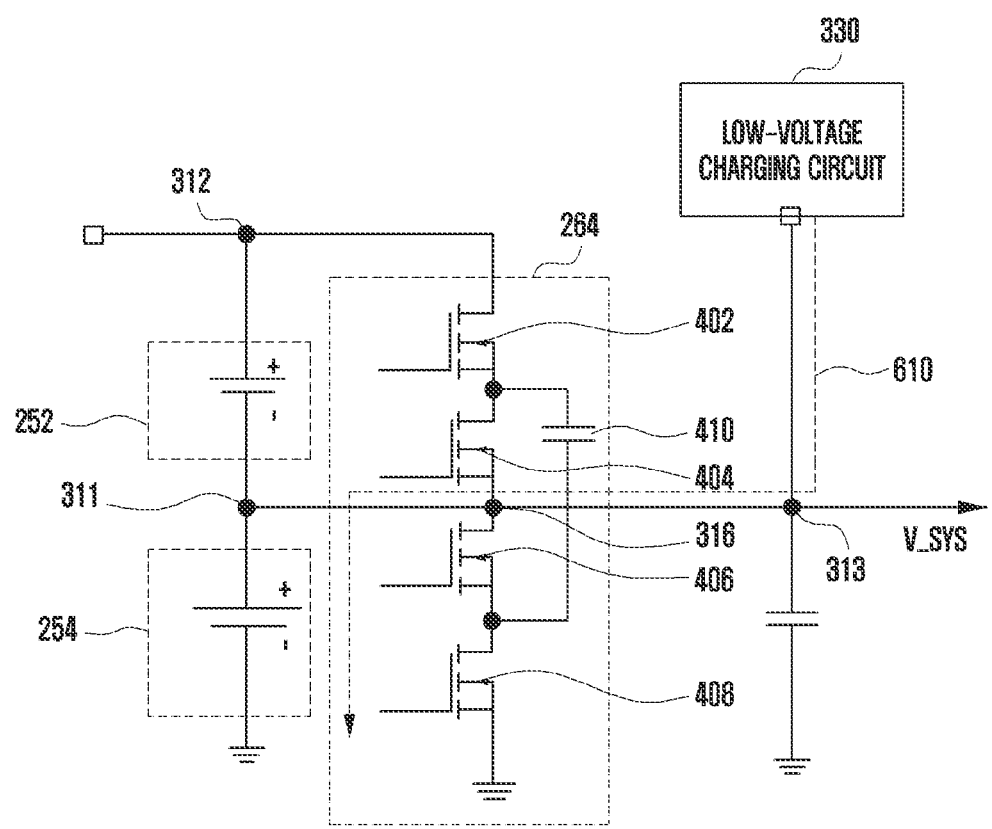
FIG. 6A illustrates a configuration for balancing batteries during low-voltage charging, according to an embodiment.
Figure 6B:
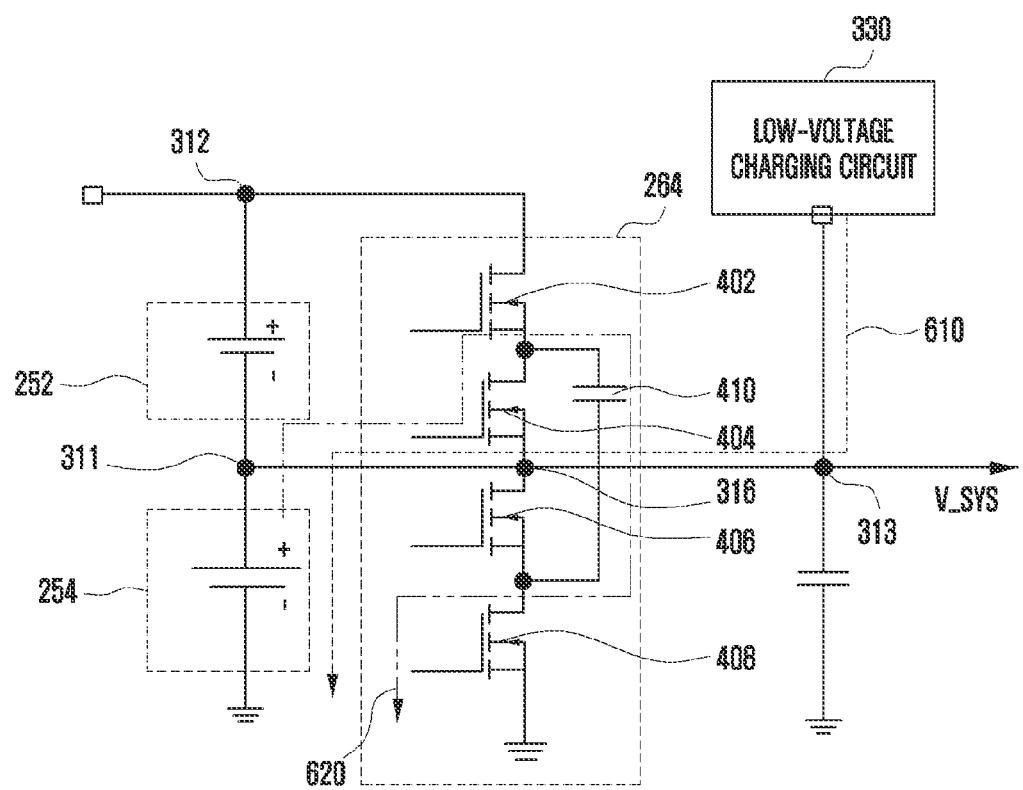
FIG. 6B illustrates a configuration for balancing batteries during low-voltage charging, according to an embodiment.
Figure 6C:
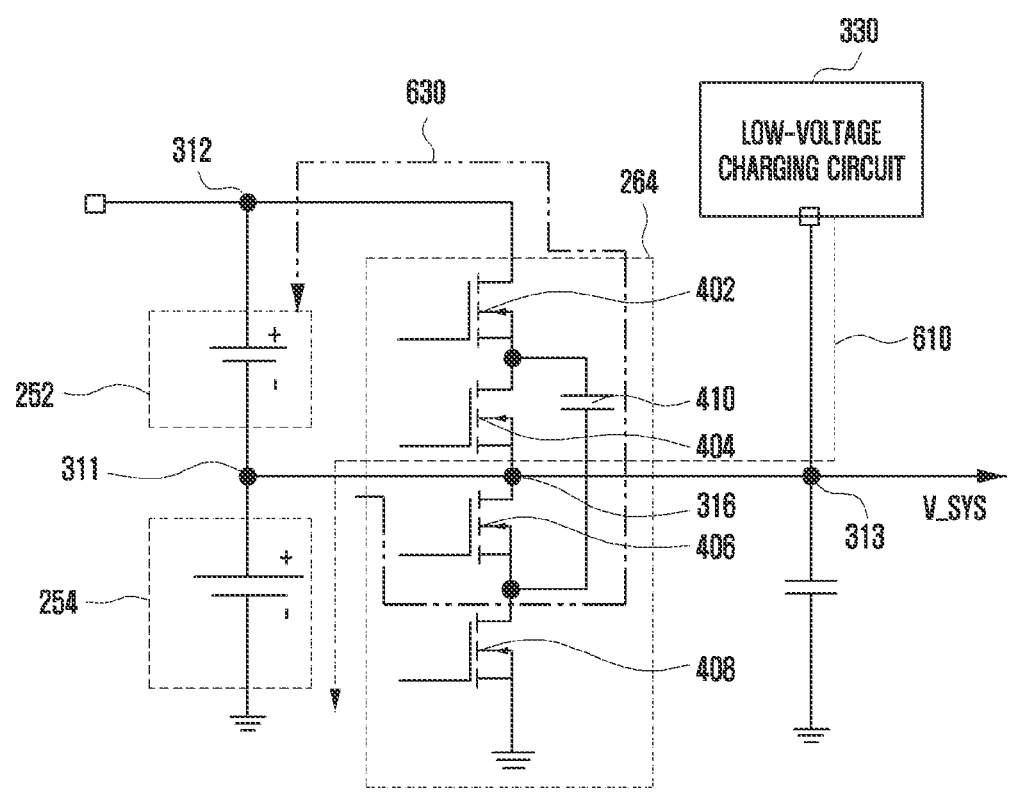
FIG. 6C illustrates a configuration for balancing batteries during low-voltage charging, according to an embodiment.

FIG. 6A illustrates a configuration for balancing batteries during low-voltage charging, according to an embodiment. FIG. 6B illustrates a configuration for balancing batteries during low-voltage charging, according to an embodiment. FIG. 6C illustrates a configuration for balancing batteries during low-voltage charging, according to an embodiment.

Referring to FIG. 6A to FIG. 6C, the voltage divider circuit 264 may include a first transistor 402, a second transistor 404, a third transistor 406, a fourth transistor 408, and a first capacitor 410. In the following description, internal components of the voltage divider circuit 264 may operate similarly to the internal components of the voltage divider circuit 264 in FIG. 4A. The first transistor 402, the second transistor 404, the third transistor 406, the fourth transistor 408, and the first capacitor 410 in FIG. 6A to FIG. 6C may operate similarly to the first transistor 402, the second transistor 404, the third transistor 406, the fourth transistor 408, and the first capacitor 410 in FIG. 4A. For this reason, detailed descriptions of internal components of the voltage divider circuit 264 will be omitted herein.

When charging the batteries 252 and/or 254 according to a low-voltage charging scheme, the low-voltage charging circuit 330 may apply (610) a charging current to the first node 311 through the third node 313, as in FIG. 6A. The second battery 254 may be charged based on the charging current applied to the first node 311 from the low-voltage charging circuit 330. Accordingly, the second battery 254 may maintain a relatively higher voltage than the first battery 252 to which no charging current is applied from the low-voltage charging circuit 330. The first battery 252 to which no charging current is applied may represent a first battery 252 which is not provided with a charging current from the low-voltage charging circuit 330, and which is thus not charged based on the low-voltage charging circuit 330. However, the first battery 252 may be charged according to a low-voltage charging scheme, based on a balancing operation by the voltage divider circuit 264.

The processor 270 may turn on the voltage divider circuit 264 if the voltage difference between the first battery 252 and the second battery 254 exceeds a reference voltage (e.g., about 100 mV), based on the low-voltage charging scheme.

The voltage divider circuit 264, if turned on by the processor 270, may alternately turn on the first pair of the first transistor 402 and the third transistor 406 and the second pair of the second transistor 404 and the fourth transistor 408.

If the second pair of transistors (e.g., the second transistor 404 and the fourth transistor 408) is turned on at a first point in time, the first capacitor 410 may be electrically connected to the second battery 254 through the second pair of transistors (e.g., the second transistor 404 and the fourth transistor 408). The first capacitor 410, if connected to the second battery 254, may be charged (620) by a current provided from the second battery 254 having a voltage relatively higher than that of the first battery 252, as in FIG. 6B.

If the first pair of transistors (e.g., the first transistor 402 and the third transistor 406) is turned on at a second point in time, the first capacitor 410 may be electrically connected to the first battery 252 through the first pair of transistors. If the first capacitor 410 is connected to the first battery 252, energy accumulated by the second battery 254 may be provided to the first battery 252 having a voltage relatively lower than that of the second battery 254, as in FIG. 6C, thereby charging (630) the first battery 252. As a result, energy accumulated in the first battery 252 and the second battery 254, which has become unbalanced by the low-voltage charging circuit 320, may become uniform by means of the voltage divider circuit 264.

Figure 7A:
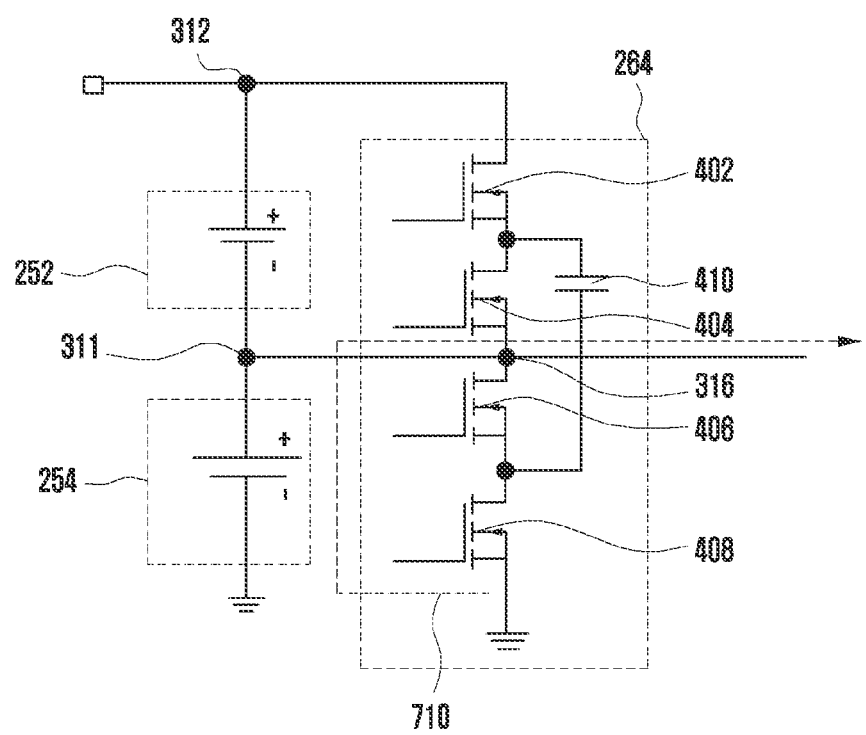
FIG. 7A illustrates a configuration for balancing batteries during system power supply, according to an embodiment.
Figure 7B:
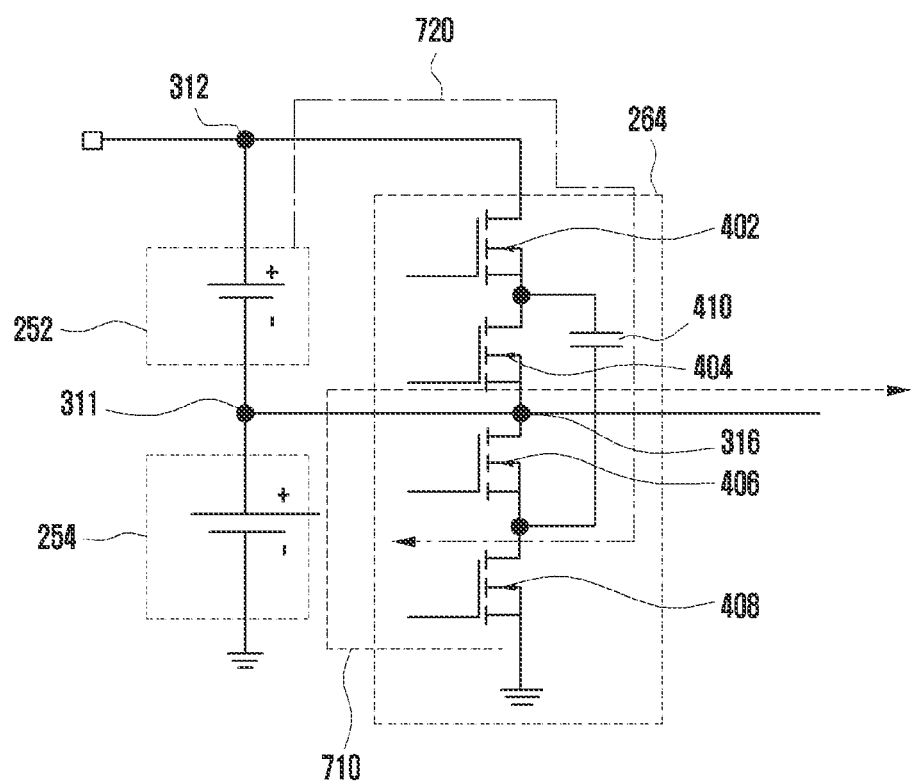
FIG. 7B illustrates a configuration for balancing batteries during system power supply, according to an embodiment.
Figure 7C:
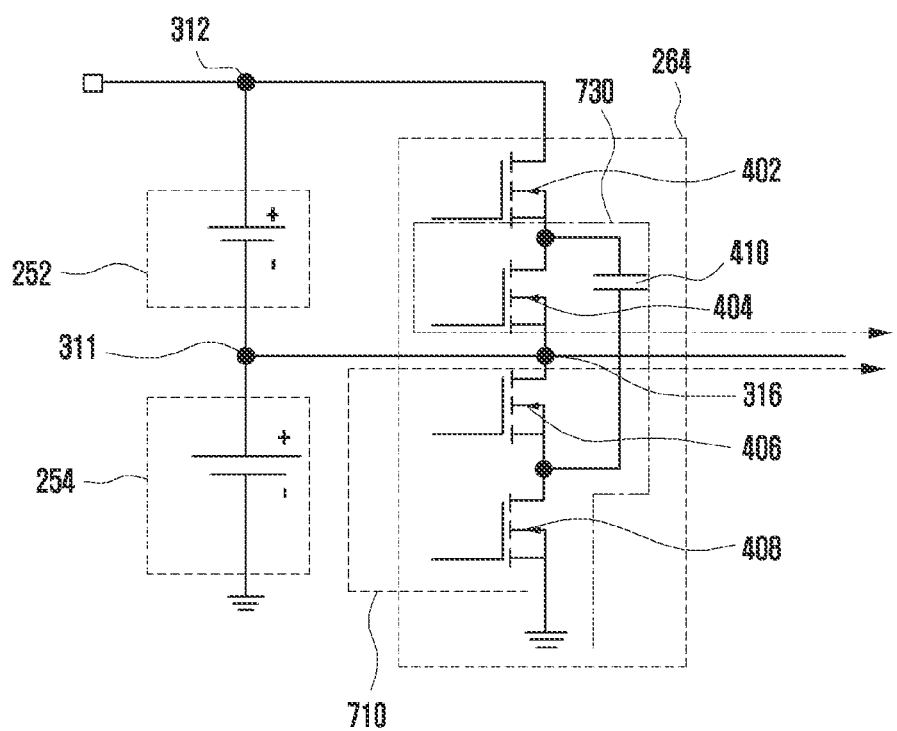
FIG. 7C illustrates a configuration for balancing batteries during system power supply, according to an embodiment.

FIG. 7A illustrates a configuration for balancing batteries during system power supply, according to an embodiment. FIG. 7B illustrates a configuration for balancing batteries during system power supply, according to an embodiment. FIG. 7C illustrates a configuration for balancing batteries during system power supply, according to an embodiment.

Referring to FIG. 7A to FIG. 7C, the voltage divider circuit 264 may include a first transistor 402, a second transistor 404, a third transistor 406, a fourth transistor 408, and a first capacitor 410. In the following description, internal components of the voltage divider circuit 264 may operate similarly to the internal components of the voltage divider circuit 264 in FIG. 4A. The first transistor 402, the second transistor 404, the third transistor 406, the fourth transistor 408, and the first capacitor 410 in FIG. 7A to FIG. 7C may operate similarly to the first transistor 402, the second transistor 404, the third transistor 406, the fourth transistor 408, and the first capacitor 410 in FIG. 4A. For this reason, detailed descriptions of internal components of the voltage divider circuit 264 will be omitted herein.

If the batteries 252 and/or 254 supply power (system power) to at least one component of the electronic device 201, the second battery 254 may be discharged (710), in order to supply the system power, as in FIG. 7A. Accordingly, the first battery 252 may maintain a voltage relatively higher than that of the second battery 254 discharged to supply the system power.

The processor 270 may turn on the voltage divider circuit 264 if the voltage difference between the first battery 252 and the second battery 254 exceeds a reference voltage (e.g., about 100 mV), based on system power supply. The voltage divider circuit 264, if turned on by the processor 270, may alternately turn on a first pair of the first transistor 402 and the third transistor 406 and a second pair of the second transistor 404 and the fourth transistor 408. The first and second pairs of transistors may be alternately turned on at the same cycle.

If the first pair of transistors e.g., the first transistor 402 and the third transistor 406) is turned on at a first point in time, the first capacitor 410 may be electrically connected to the first battery 252 through the first pair of transistors. The first capacitor 410, if connected to the first battery 252, may be charged (720) by a current provided from the first battery 252 having a voltage relatively higher than that of the second battery 254, as in FIG. 7B.

If a second pair of transistors (e.g., the second transistor 404 and the fourth transistor 408) is turned on at a second point in time, the first capacitor 410 may supply (730), as system power, energy accumulated by the first battery 252 as in FIG. 7C. The system power supplied by the first capacitor 410 may be supplied to at least one component of the electronic device 201 together with the energy discharged from the second battery 254. As a result, energy accumulated in the first battery 252 and the second battery 254, which has become unbalanced by the system power supply, may become uniform by means of the voltage divider circuit 264.

Figure 8A:
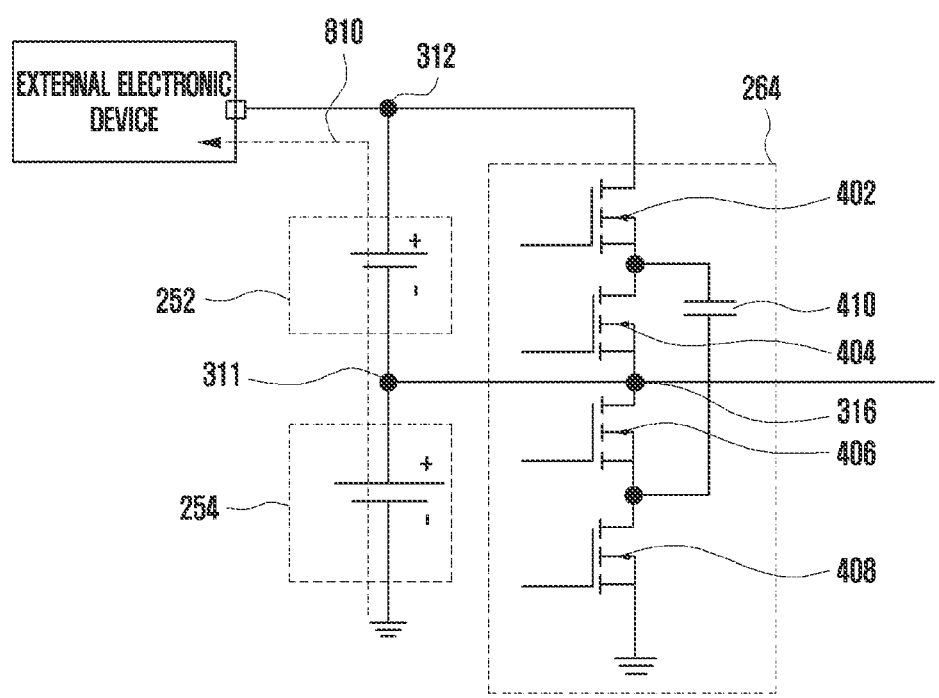
FIG. 8A illustrates a configuration for balancing batteries when power is supplied to an external electronic device, according to an embodiment.
Figure 8B:
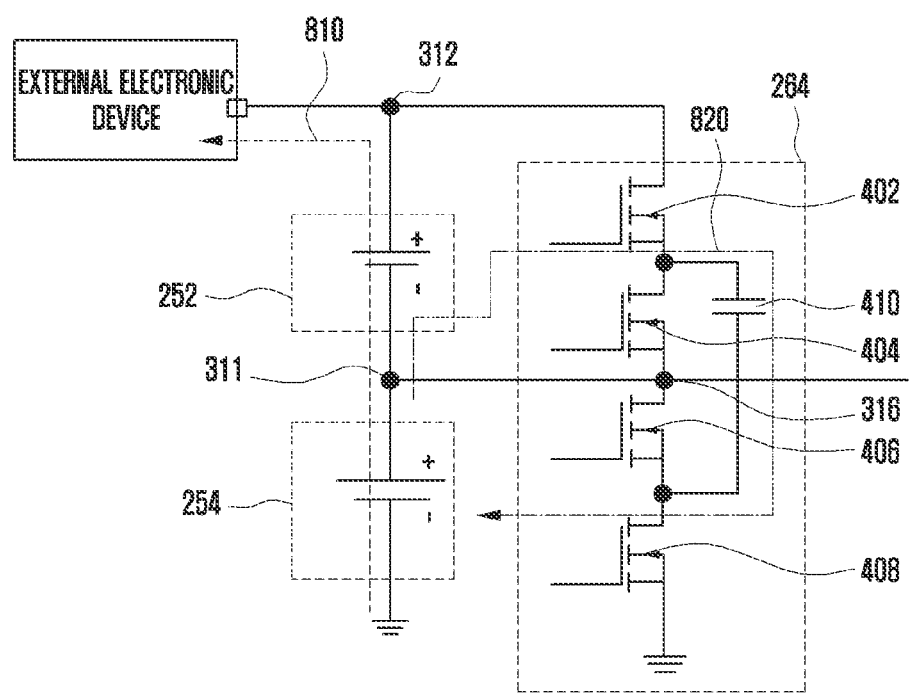
FIG. 8B illustrates a configuration for balancing batteries when power is supplied to an external electronic device, according to an embodiment.
Figure 8C:
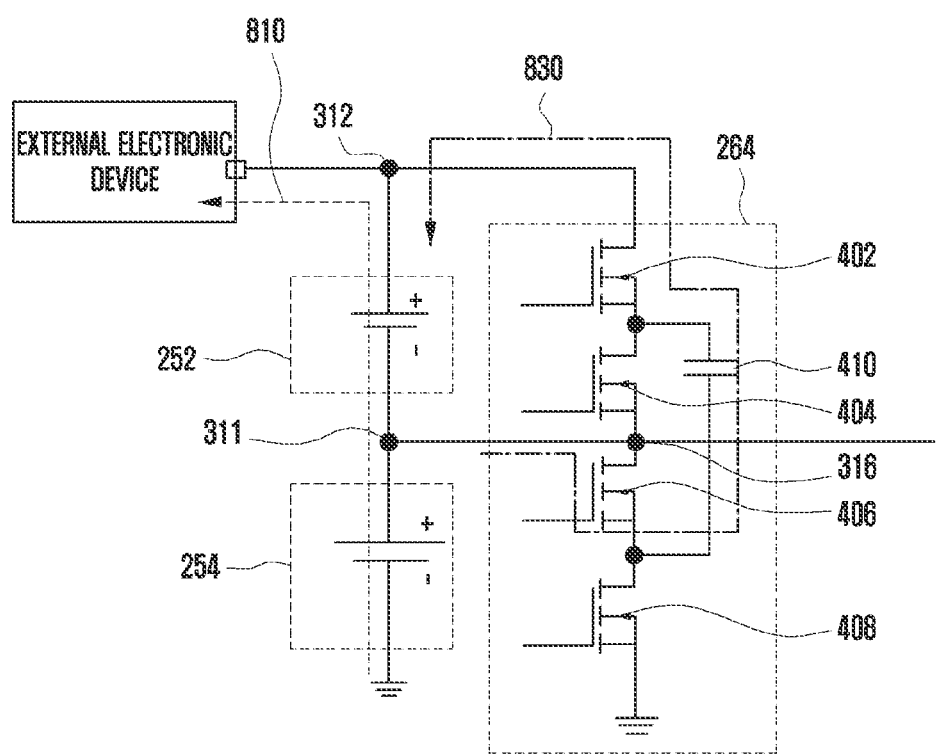
FIG. 8C illustrates a configuration for balancing batteries when power is supplied to an external electronic device, according to an embodiment.

FIG. 8A illustrates a configuration for balancing batteries when power is supplied to an external electronic device (or internal electronic device), according to an embodiment. FIG. 8B illustrates a configuration for balancing batteries when power is supplied to an external electronic device (or internal electronic device), according to an embodiment. FIG. 8C illustrates a configuration for balancing batteries when power is supplied to an external electronic device (or internal electronic device), according to an embodiment. It may be assumed in the following description that the first battery 252 has a capacity (or maximum capacity) relatively smaller than that of the second battery 254.

Referring to FIG. 8A to FIG. 8C, the voltage divider circuit 264 may include a first transistor 402, a second transistor 404, a third transistor 406, a fourth transistor 408, and a first capacitor 410. In the following description, internal components of the voltage divider circuit 264 may operate similarly to the internal components of the voltage divider circuit 264 in FIG. 4A. For example, the first transistor 402, the second transistor 404, the third transistor 406, the fourth transistor 408, and the first capacitor 410 in FIG. 8A to FIG. 8C may operate similarly to the first transistor 402, the second transistor 404, the third transistor 406, the fourth transistor 408, and the first capacitor 410 in FIG. 4A. For this reason, detailed descriptions of internal components of the voltage divider circuit 264 will be omitted herein.

If the batteries 252 and/or 254 supply power to an external electronic device (e.g., a direct current (DC)-DC convertor or a wireless charger), the first battery 252 and the second battery 254 connected in series may be discharged (810), as in FIG. 8A. If the capacity (or maximum capacity) of the second battery 254 relatively larger than that of the first battery 252, the voltage of the second battery 254 may be maintained relatively higher than that of the first battery 252 by means of a discharge for supplying power to the external electronic device.

The processor 270 may turn on the voltage divider circuit 264 if the voltage difference between the first battery 252 and the second battery 254 exceeds a reference voltage (e.g., about 100 mV), based on supply of power to the external electronic device. The voltage divider circuit 264, if turned on by the processor 270, may alternately turn on a first pair of the first transistor 402 and the third transistor 406 and a second pair of the second transistor 404 and the fourth transistor 408.

If the second pair of transistors (e.g., the second transistor 404 and the fourth transistor 408) is turned on at a first point in time, the first capacitor 410 may be electrically connected to the second battery 254 through the second pair of transistors. The first capacitor 410, if connected to the second battery 254, may be charged (820) by a current provided from the second battery 254 having a voltage relatively higher than that of the first battery 252, as in FIG. 8B.

If the first pair of transistors (e.g., the first transistor 402 and the third transistor 406) is turned on at a second point in time, the first capacitor 410 may be electrically connected to the first battery 252 through the first pair of transistors. If the first capacitor 410 is connected to the first battery 252, energy accumulated by the second battery 254 may be provided to the first battery 252 having a voltage relatively lower than that of the second battery 254, as in FIG. 8C, thereby charging (830) the first battery 252. As a result, energy accumulated in the first battery 252 and the second battery 254, which has become unbalanced by the supply of power to the external electronic device (or internal electronic device), may become uniform by means of the voltage divider circuit 264.

According to an embodiment, an electronic device (e.g., the electronic device 101 in FIG. 1 or the electronic device 201 in FIG. 2A and FIG. 2B) may include a voltage divider circuit, (e.g., the voltage divider circuit 264 in FIG. 2B); a first battery (e.g., the first battery 252 in FIG. 2B) electrically connected to a first point of the voltage divider circuit, and a second battery (e.g., the second battery 254 in FIG. 2B) connected in series to the first battery. A second point different from the first point of the voltage divider circuit may be electrically connected from a first node on an electric path through which the first battery and the second battery are electrically connected.

The electronic device may further include a high-voltage charging circuit the high-voltage charging circuit 320 in FIG. 3) and a low-voltage charging circuit (e.g., the low-voltage charging circuit 330 in FIG. 3). The high-voltage charging circuit may be electrically connected to a second node on a second electric path through which the first battery and the first point of the voltage divider circuit are electrically connected. The low-voltage charging circuit may be electrically connected to a third node electrically connected from the first node through the second point of the voltage divider circuit.

The second battery may be charged based on a charging current applied to the first node from the low-voltage charging circuit through the second point of the voltage divider circuit.

The first battery and the second battery may be charged based on a charging current applied to the second node from the high-voltage charging circuit.

The second battery may supply power to an internal system of the electronic device through the second point of the voltage divider circuit connected to the first node.

The voltage divider circuit may include a capacitor (e.g., the first capacitor 410 in FIG. 4A) and multiple transistors connected in series. The first transistor (e.g., the first transistor 402 in FIG. 4A) among the multiple transistors may be electrically connected between the second node and a fourth node. The second transistor (e.g., the second transistor 404 in FIG. 4A) among the multiple transistors may be electrically connected between the fourth node and the second point of the voltage divider circuit. The third transistor (e.g., the third transistor 406 in FIG. 4A) among the multiple transistors may be electrically connected between the second point of the voltage divider circuit and a fifth node. The fourth transistor (e.g., the fourth transistor 408 in FIG. 4A) among the multiple transistors may be electrically connected between the fifth node and a ground unit. The capacitor may be electrically connected between the fourth node, the third transistor, and the fifth node.

A pair of the first transistor and the third transistor and a pair of the second transistor and the fourth transistor may be alternately turned on if the voltage divider circuit is turned on.

The capacitor may be electrically connected to the first battery if the pair of the first transistor and the third transistor is turned on, and the capacitor may be electrically connected to the second battery if the pair of the second transistor and the fourth transistor is turned on.

The electronic device may further include at least one processor (e.g., the processor 270 in FIG. 2B). The at least one processor may control the voltage divider circuit so as to be turned on if a voltage difference between the first battery and the second battery satisfies a designated first condition, and may control the voltage divider circuit so as to be turned off if the voltage difference between the first battery and the second battery does not satisfy the designated first condition.

The at least one processor may control at least some of multiple sub-divider circuits included in the voltage divider circuit so as to be turned on if the voltage difference between the first battery and the second battery satisfies a designated second condition in a state in which the voltage divider circuit is turned on, and may adjust a turning-on cycle of the voltage divider circuit if the voltage difference between the first battery and the second battery satisfies a designated third condition in a state in which at least a part of the voltage divider circuit is turned on.

The voltage divider circuit may include a first sub-divider circuit (e.g., the third sub-divider circuit 460 in FIG. 4C) including a first transistor having an on-resistance configured to have a first value (e.g., about 25 mΩ), and a second sub-divider circuit (e.g., the fourth sub-divider circuit 480 in FIG. 4C) including a second transistor having an on-resistance configured to have a second value (e.g., about 10 mΩ. The voltage divider circuit may be configured such that the first sub-divider circuit is turned on if a voltage difference between the first battery and the second battery satisfies a designated third condition, and the second sub-divider circuit is turned on if the voltage difference between the first battery and the second battery does not satisfy the designated third condition.

According to an embodiment, an electronic device (e.g., the electronic device 101 in FIG. 1 or the electronic device 201 in FIG. 2A and FIG. 2B) may include a first battery, (e.g., the first battery 252 in FIG. 2B); a second battery (e.g., the second battery 254 in FIG. 2B) connected in series to the first battery, a power management module (e.g., the power management module 220 in FIG. 2B) configured to control charging and/or discharging of the first battery and the second battery, and a processor (e.g., the processor 270 in FIG. 2B) operatively connected to the power management module. The power management module may include a voltage divider circuit (e.g., the voltage divider circuit 264 in FIG. 2B) having a first point connected to the first battery and having a second point, which is different from the first point, connected to a node on an electric path through which the first battery and the second battery are electrically connected. The processor may turn on the voltage divider circuit if a voltage difference between the first battery and the second battery satisfies a designated condition.

Figure 9:
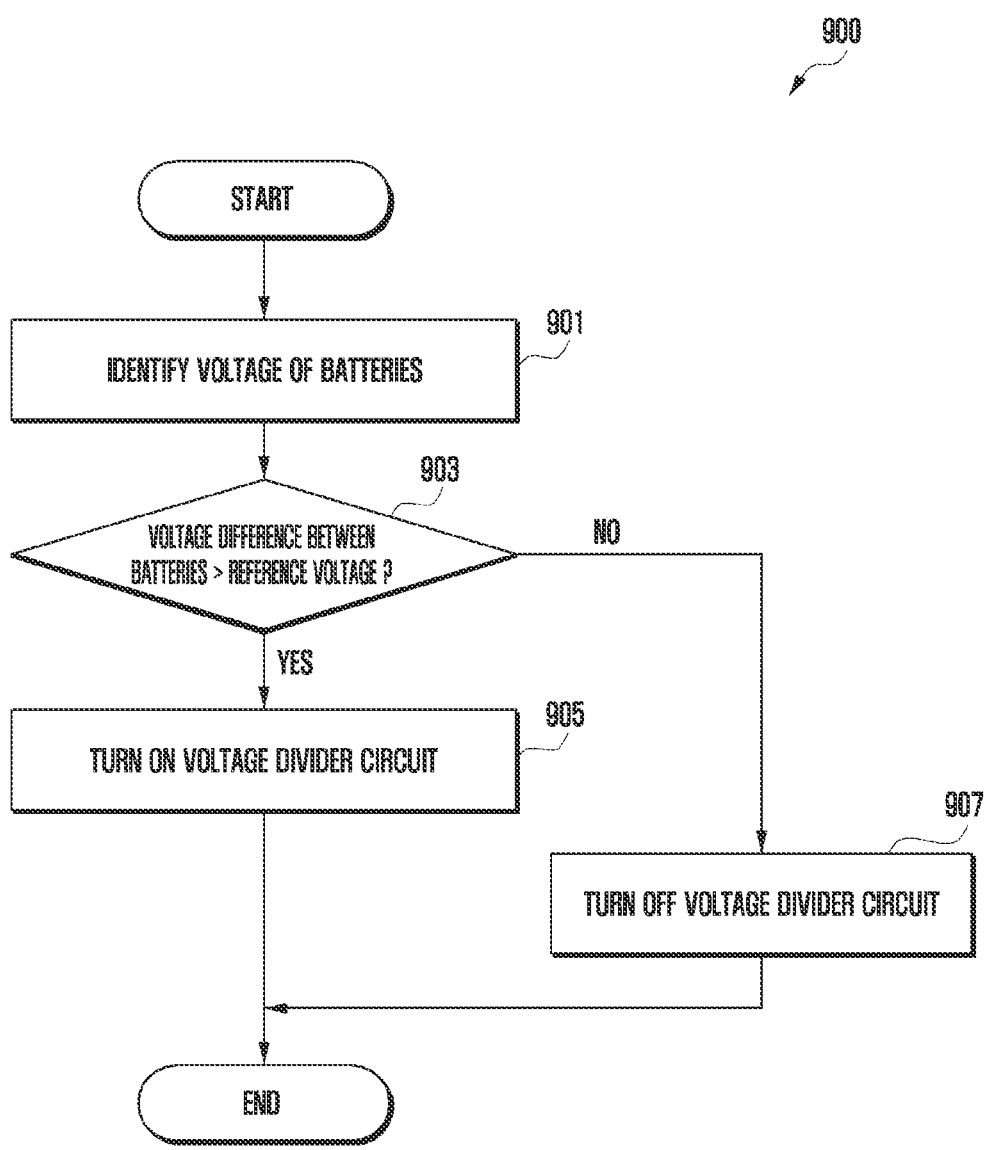
FIG. 9 is a flowchart for a method of controlling a voltage divider circuit in connection with an electronic device, according to an embodiment.

FIG. 9 is a flowchart for a method of controlling a voltage divider circuit in connection with an electronic device, according to an embodiment. In the following embodiments, respective operations may be performed successively, but are not necessarily performed successively. The order of respective operations may be changed, and at least two operations may be performed in parallel. The electronic device, in this regard, may be the electronic device 101 in FIG. 1 or the electronic device 201 in FIG. 2A and FIG. 2B.

Referring to FIG. 9, the electronic device (e.g., the processor 120 in FIG. 1 or the processor 270 in FIG. 2B) may, in operation 901, identify the voltage of multiple batteries (e.g., the first battery 252 and/or the second battery 254 in FIG. 2B) included in the electronic device. The processor 270 may identify the voltage of the first battery 252 and the second battery 254 connected in series, by using a detecting module 266. The voltage of the first battery 252 and the second battery 254 may be identified periodically, at a designated time, or in response to detecting the occurrence of an event corresponding to voltage identification (e.g., if the amount of consumed current is equal to/larger than a reference value).

The electronic device may, in operation 903, identify whether or not the voltage difference between the batteries (e.g., the first battery 252 and the second battery 254) exceeds a reference voltage (e.g., about 100 mV). The processor 270 may identify whether or not the voltage difference between the first battery 252 and the second battery 254, which has been identified through the detecting module 266, exceeds the reference voltage.

If the voltage difference between the batteries exceeds the reference voltage ("Yes" in operation 903), the electronic device may turn on a voltage divider circuit in operation 905. If the voltage difference between the first battery 252 and the second battery 254 exceeds the reference voltage, the processor 270 may turn on the voltage divider circuit 264 for balancing the batteries. The voltage divider circuit 264, if turned on, may alternately turn on the first transistor 402 the third transistor 406, the second transistor 404, and the fourth transistor 408, as in FIG. 4A, such that the energy accumulated in the first battery 252 and the second battery 254 becomes uniform.

If the voltage difference between the batteries is equal to/lower than the reference voltage ("No" in operation 903), the electronic device may turn off the voltage divider circuit 264 in operation 907. If the voltage difference between the first battery 252 and the second battery 254 is equal to/lower than the reference voltage, the processor 270 may turn off the voltage divider circuit 264 in order to reduce current consumption.

Figure 10:
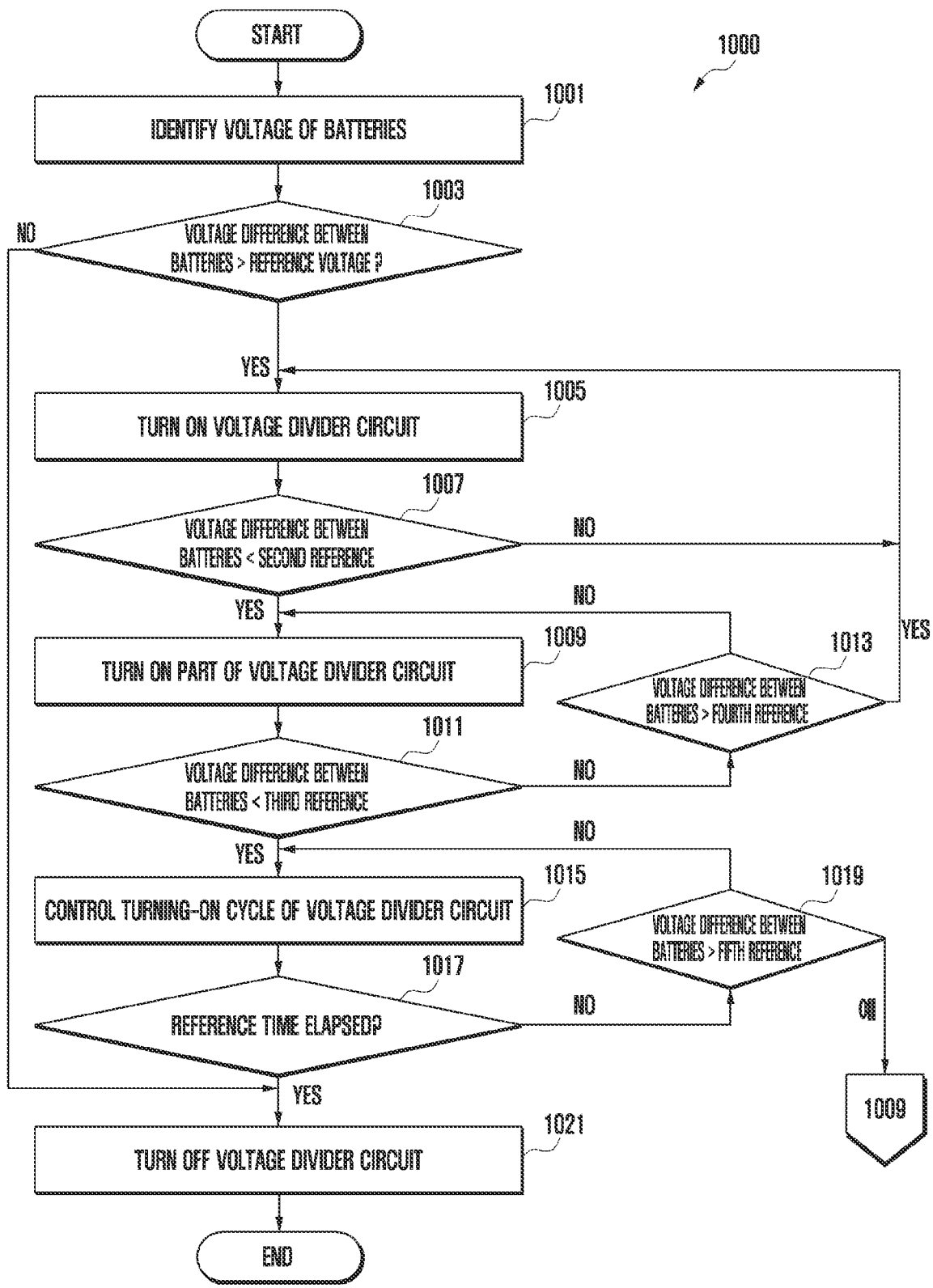
FIG. 10 is a flowchart for a method of controlling a voltage divider circuit based on a voltage difference between batteries in connection with an electronic device, according to an embodiment.

FIG. 10 is a flowchart for a method of controlling a voltage divider circuit based on a voltage difference between batteries in connection with an electronic device, according to an embodiment. In the following embodiments, respective operations may be performed successively, but are not necessarily performed successively. The order of respective operations may be changed, and at least two operations may be performed in parallel. The electronic device, in this regard, may be the electronic device 101 in FIG. 1 or the electronic device 201 in FIG. 2A and FIG. 2B.

Referring to FIG. 10, the electronic device (e.g., the processor 120 in FIG. 1 or the processor 270 in FIG. 2B) may, in operation 1001, identify the voltage of multiple batteries (e.g., the first battery 252 and/or the second battery 254 in FIG. 2B) included in the electronic device. A detecting module 266 may monitor the voltage of the first battery 252 and the second battery 254 periodically, at a designated time, or in response to detecting the occurrence of an event corresponding to voltage identification.

The electronic device may, in operation 1003, identify whether or not the voltage difference between the batteries (e.g., the first battery 252 and the second battery 254) exceeds a first reference voltage (e.g., about 100 mV). The processor 270 may identify whether or not the voltage difference between the first battery 252 and the second battery 254, which has been identified through the detecting module 266, exceeds the reference voltage.

If the voltage difference between the batteries exceeds the first reference voltage ("Yes" in operation 1003), the electronic device may turn on a voltage divider circuit (e.g., the voltage divider circuit 264 in FIG. 2B) in operation 1005. If the voltage difference between the first battery 252 and the second battery 254 exceeds the first reference voltage, the processor 270 may turn on the voltage divider circuit 264 such that the voltage divider circuit 264 operates in a first mode. The voltage divider circuit 264, if turned on in the first mode, may turn on both the first sub-divider circuit 420 and the second sub-divider circuit 440, as in FIG. 4B, thereby balancing the first battery 252 and the second battery 254. If the first sub-divider circuit 420 operates in the first mode, the first pair of the fifth transistor 422 and the seventh transistor 426 and the second pair of the sixth transistor 424 and the eighth transistor 428 may be alternately turned on. In this case, the second capacitor 430 may be connected to the first battery 252 or the second battery 254, based on the turned-on transistors (e.g., the first pair or the second pair), such that energy accumulated in the first battery 252 and the second battery 254 in an unbalanced manner is uniformly adjusted. If the second sub-divider circuit 440 operates in the first mode, the first pair of the ninth transistor 442 and the eleventh transistor 446 and the second pair of the tenth transistor 444 and the twelfth transistor 448 may be alternately turned on. In this case, the third capacitor 450 may be connected to the first battery 252 or the second battery 254, based on the turned-on transistors (e.g., the first pair or the second pair), such that energy accumulated in the first battery 252 and the second battery 254 in an unbalanced manner is uniformly adjusted. The first sub-divider circuit 420 and the second sub-divider circuit 440 may be synchronized in the first mode.

The electronic device may identify, in operation 1007, whether or not the voltage difference between the batteries has dropped below a second reference voltage (e.g., about 60 mV), based on turning-on of the voltage divider circuit. The processor 270 may identify whether or not the voltage difference between the first battery 252 and the second battery 254 has dropped below the second reference voltage by means of the voltage divider circuit 264 operating in the first mode.

If the voltage difference between the batteries is equal to/higher than the second reference voltage (e.g., about 60 mV) (e.g., "No" in operation 1007), the electronic device may maintain driving of the voltage divider circuit in the first mode in operation 1005.

If the voltage difference between the batteries has dropped below the second reference voltage (e.g., "Yes" in operation 1007), the electronic device may turn on at least a part of the voltage divider circuit in operation 1009. The processor 270 may turn on a part of the voltage divider circuit 264 such that the voltage divider circuit 264 operates in the second mode. If the voltage divider circuit 264 includes a first sub-divider circuit 420 and a second sub-divider circuit 440 as in FIG. 4B, the voltage divider circuit 264 may turn on one of the first sub-divider circuit 420 or the second sub-divider circuit 440, thereby balancing the first battery 252 and the second battery 254. If the first sub-divider circuit 420 has been turned on to operate in the second mode, the first pair of the fifth transistor 422 and the seventh transistor 426 and the second pair of the sixth transistor 424 and the eighth transistor 428 may be alternately turned on.

The electronic device may identify, in operation 1011, whether or not the voltage difference between the batteries has dropped below a third reference voltage (e.g., about 20 mV), based on turning-on of at least a part of the voltage divider circuit. The processor 270 may identify whether or not the voltage difference between the first battery 252 and the second battery 254 has dropped below the third reference voltage by means of the voltage divider circuit 264 operating in the second mode.

If the voltage difference between the batteries is equal to/higher than the third reference voltage (e.g., about 20 mV) (e.g., "No" in operation 1011), the electronic device may identify in operation 1013, whether or not the voltage difference between the batteries exceeds a fourth reference voltage (e.g., about 80 mV).

If the voltage difference between the batteries is equal to/higher than the third reference voltage (e.g., "No" in operation 1011) and equal to/lower than the fourth reference voltage (e.g., "No" in operation 1013), the electronic device may maintain the driving of the voltage divider circuit in the second mode in operation 1009.

If the voltage difference between the batteries (exceeds the fourth reference voltage (e.g., "Yes" in operation 1013), the electronic device may switch the operating mode of the voltage divider circuit to the first mode in operation 1005. The processor 270 may turn on both the first sub-divider circuit 420 and the second sub-divider circuit 440, thereby balancing the first battery 252 and the second battery 254.

If the voltage difference between the batteries drops below the third reference voltage (e.g., "Yes" in operation 1011), the electronic device may control the cycle at which the voltage divider circuit is turned on, in operation 1015. The processor 270 may configure the cycle at which the voltage divider circuit 264 is turned on such that the voltage divider circuit 264 operates in the third mode. The voltage divider circuit 264 may be periodically turned on, based on the turning-on cycle, thereby balancing the first battery 252 and the second battery 254. If the turning-on cycle of the voltage divider circuit 264 arrives, the first pair of the fifth transistor 422 and the seventh transistor 426 and the second pair of the sixth transistor 424 and the eighth transistor 428 may be alternately turned on at a first cycle, during the turning-on interval. If a turning-off interval of the voltage divider circuit 264 arrives, the same may be turned off, thereby limiting the driving of the fifth transistor 422, the sixth transistor 424, the seventh transistor 426, and eighth transistor 428.

The electronic device may identify whether or not a reference time elapses after the turning-on cycle of the voltage divider circuit is controlled, in operation 1017. The processor 270 may identify whether or not driving of a tinier expires, the timer being driven at a point in time at which the voltage divider circuit 264 switches to the third mode.

If the reference time has not elapsed (e.g., "No" in operation 1017), the electronic device may identify, in operation 1019, whether or not the voltage difference between the batteries exceeds a fifth reference voltage (e.g., about 40 mV).

If the voltage difference between the batteries is equal to/lower than the fifth reference voltage (e.g., "No" in operation 1019), the electronic device may maintain the driving of the voltage divider circuit in the third mode in operation 1015.

If the voltage difference between the batteries exceeds the fifth reference voltage (e.g., "Yes" in operation 1019), the electronic device may switch the operating mode of the voltage divider circuit to the second mode in operation 1009. The processor 270 may turn on one of the first sub-divider circuit 420 or the second sub-divider circuit 440, thereby balancing the first battery 252 and the second battery 254.

If the reference time has elapsed (e.g., "Yes" in operation 1017), the electronic device may turn off the voltage divider circuit in operation 1021. The processor 270 may determine that energy accumulated in the first battery 252 and the second battery 254 is uniform if the voltage difference between the first battery 252 and the second battery 254 remains below the third reference voltage (e.g., about 20 mV) during the reference time. Accordingly, the processor 270 may turn off the voltage divider circuit 264 in order to reduce current consumption.

If the voltage divider circuit 264 switches to the third mode, the electronic device may control the switching cycle of a pair of transistors. If the first sub-divider circuit 420 in FIG. 4B is turned on such that the voltage divider circuit 264 operates in the second mode, the first pair of the fifth transistor 422 and the seventh transistor 426 and the second pair of the sixth transistor 424 and the eighth transistor 428 may be alternately turned on at a first cycle. If the voltage divider circuit 264 switches to the third mode, the first pair of the fifth transistor 422 and the seventh transistor 426 and the second pair of the sixth transistor 424 and the eighth transistor 428 may be alternately turned on at a second cycle which is configured to be relatively longer than the first cycle.

Figure 11:
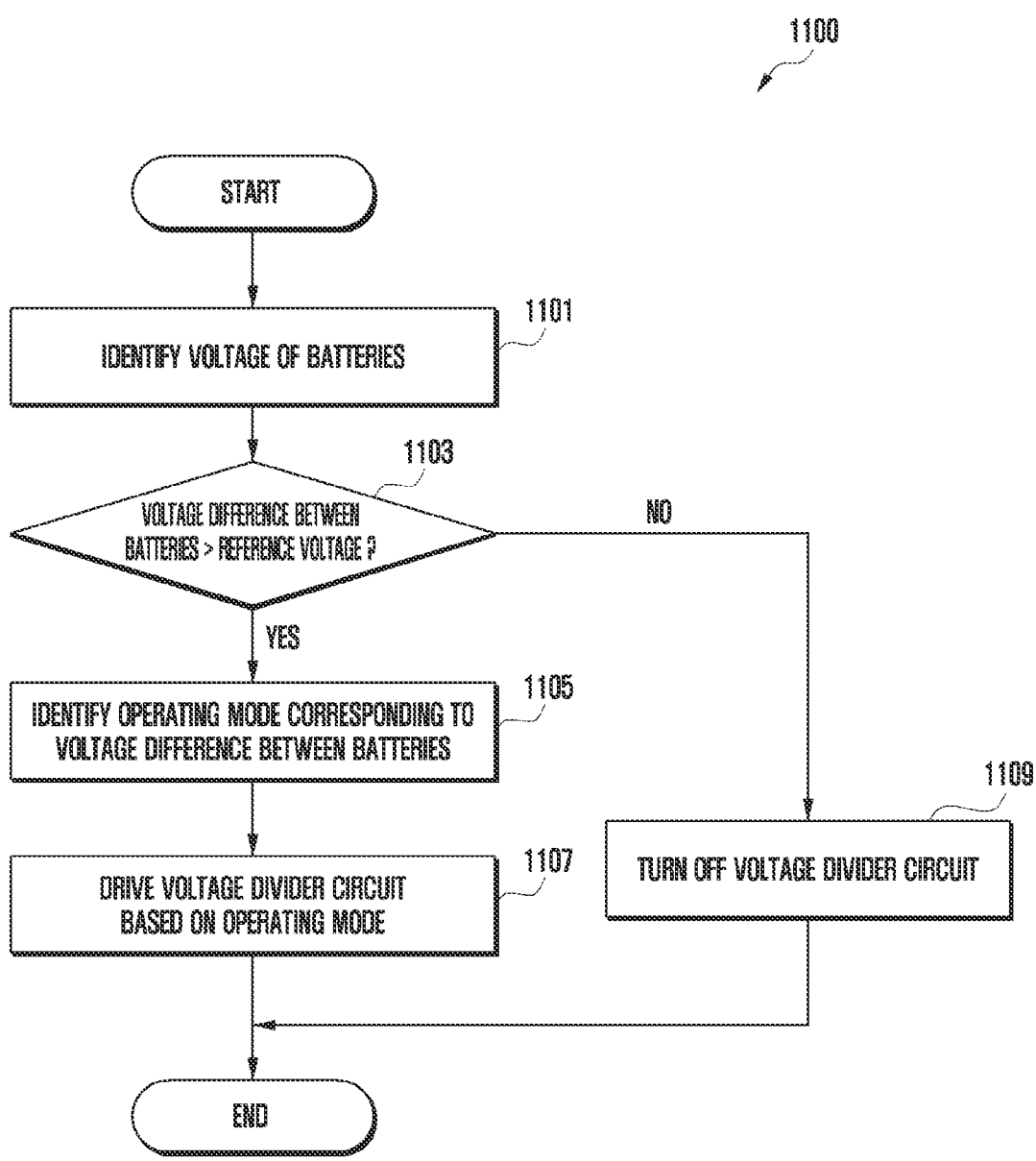
FIG. 11 is a flowchart for a method of determining the operating mode of a voltage divider circuit based on a voltage difference between batteries in connection with an electronic device, according to an embodiment.

FIG. 11 is a flowchart for a method of determining the operating mode of a voltage divider circuit based on a voltage difference between batteries in connection with an electronic device, according to an embodiment. In the following embodiments, respective operations may be performed successively, but are not necessarily performed successively. The order of respective operations may be changed, and at least two operations may be performed in parallel. The electronic device, in this regard, may be the electronic device 101 in FIG. 1 or the electronic device 201 in FIG. 2A and FIG. 2B.

Referring to FIG. 11, the electronic device (e.g., the processor 120 in FIG. 1 or the processor 270 in FIG. 2B) may identify the voltage of each of multiple batteries first battery 252 and/or a second battery 254) included in the electronic device in operation 1101. The processor 270 may identify the voltage of the first battery 252 and the second battery 254, by using a detecting module 266, periodically, at a designated time, or in response to detecting the occurrence of an event corresponding to voltage identification.

The electronic device may identify, in operation 1103, whether or not the voltage difference between the batteries (e.g., the first battery 252 and the second battery 254) exceeds a reference voltage (e.g., about 20 mV). The processor 270 may identify whether or not the voltage difference between the first battery 252 and the second battery 254, which has been identified through the detecting module 266, exceeds the reference voltage.

If the voltage difference between the first battery 252 and the second battery 254 exceeds the reference voltage (e.g., "Yes" in operation 1103), the electronic device may identify, in operation 1105, the operating mode of the voltage divider circuit based on the voltage difference between the batteries. If the voltage difference between the first battery 252 and the second battery 254 exceeds a first reference voltage (e.g., about 100 mV), the processor 270 may determine that the operating mode of the voltage divider circuit 264 is a first mode in which the voltage divider circuit 264 is entirely turned on. If the voltage difference between the first battery 252 and the second battery 254 is equal to/lower than the first reference voltage (e.g., about 100 mV) and exceeds a second reference voltage (e.g., about 60 mV), the processor 270 may determine that the operating mode of the voltage divider circuit 264 is a second mode in which at least a part of the voltage divider circuit 264 is turned on. If the voltage difference between the first battery 252 and the second battery 254 is equal to/lower than the second reference voltage (e.g., about 60 mV) and exceeds a third reference voltage (e.g., about 20 mV), the processor 270 may determine that the operating mode of the voltage divider circuit 264 is a third mode in which the turning-on cycle of the voltage divider circuit 264 is controlled.

The electronic device may drive the voltage divider circuit based on the operating mode of the voltage divider circuit corresponding to the voltage difference between the batteries in operation 1107. If the voltage divider circuit 264 includes multiple sub-divider circuits 420 and 440 as in FIG. 4B, the multiple sub-divider circuits 420 and 440 may all be turned on based on a first mode. If the voltage divider circuit 264 includes multiple sub-divider circuits 420 and 440 as in FIG. 4B, one of the first sub-divider circuit 420 or the second sub-divider circuit 440 may be turned on based on a second mode. If the voltage divider circuit 264 includes multiple sub-divider circuits 420 and 440 as in FIG. 4B, the turning-on cycle of a sub-divider circuit 430 or 440, which has been turned on among the first sub-divider circuit 420 and the second sub-divider circuit 440, may be configured based on a third mode.

If the voltage difference between the batteries is equal to/lower than a reference voltage (e.g., "No" in operation 1103), the electronic device may turn off the voltage divider circuit in operation 1109. If the voltage difference between the first battery 252 and the second battery 254 is equal to/lower than the reference voltage (20 mV), the processor 270 may determine that energy is evenly accumulated in the first battery 252 and the second battery 254. Accordingly, the processor 270 may control the voltage divider circuit 264 such that the voltage divider circuit 264 is turned off, in order to reduce current consumption.

The electronic device may drive the voltage divider circuit 264, which is configured as in FIG. 4A, in an operating mode corresponding to the voltage difference between the first battery 252 and the second battery 254. If the voltage divider circuit 264 is configured as in FIG. 4A, the first transistor 402, the second transistor 404, the third transistor 406, and the fourth transistor 408 may be turned on based on a first mode. The first pair of the first transistor 402 and the third transistor 406 and the second pair of the second transistor 404 and the fourth transistor 408 may be alternately turned on at a first cycle. If the voltage divider circuit 264 is configured as in FIG. 4A, the switching cycle of the pair of transistors turned on based on a second mode may be changed to be relatively longer. The first pair of the first transistor 402 and the third transistor 406 and the second pair of the second transistor 404 and the fourth transistor 408 may be alternately turned on at a second cycle configured to be relatively longer than the first cycle. If the voltage divider circuit 264 is configured as in FIG. 4A, the turning-on cycle of the voltage divider circuit 264 may be configured based on a third mode. If a turning-on cycle of the voltage divider circuit 264 arrives, the first pair of the first transistor 402 and the third transistor 406 and the second pair of the second transistor 404 and the fourth transistor 408 may be alternately turned on at a second cycle during a turning-on interval. If a turning-off interval of the voltage divider circuit 264 arrives, the same may be turned off, thereby limiting the driving of the first transistor 402, the second transistor 404, the third transistor 406, and the fourth transistor 408. The turning-on cycle of the voltage divider circuit 264 may include a cycle at which the voltage divider circuit 264 switches to a turned-on state or a turned-off state, and the second cycle (or first cycle) may include a switching cycle of a pair of transistors (e.g., first or second pair) which is turned on inside the voltage divider circuit 264 if the voltage divider circuit 264 is in a turned-on state.

Figure 12:
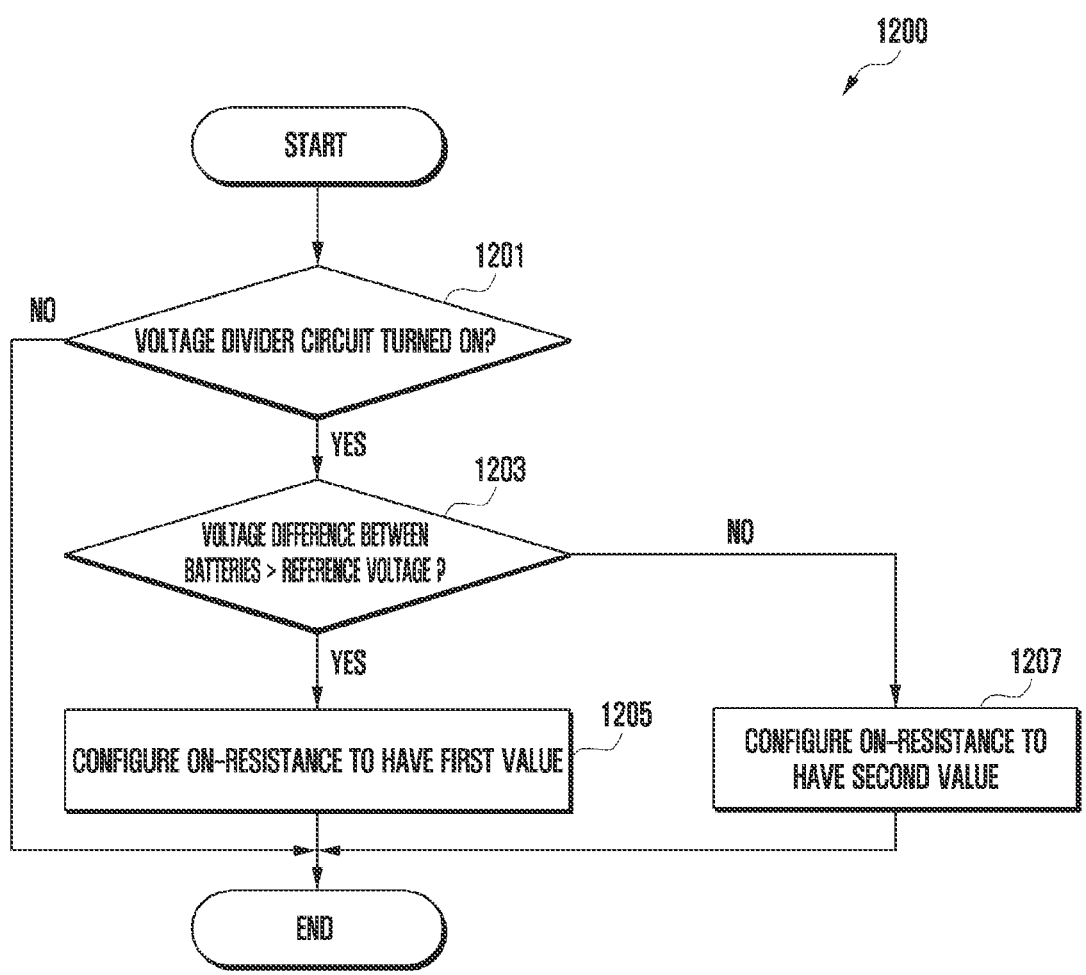
FIG. 12 is a flowchart for a method of configuring an on-resistance of a transistor in connection with an electronic device, according to an embodiment.
Figure 13A:
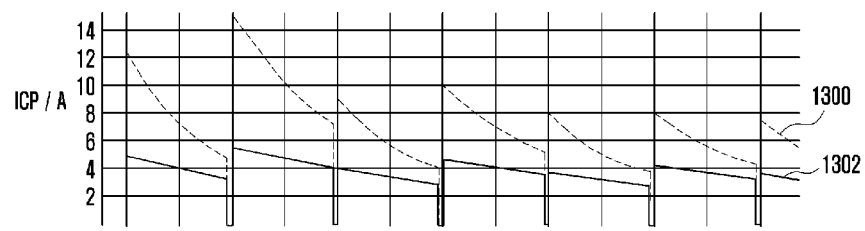
FIG. 13A is a graph illustrating a change in the amount of current with regard to the on-resistance of a transistor, according to an embodiment.
Figure 13B:
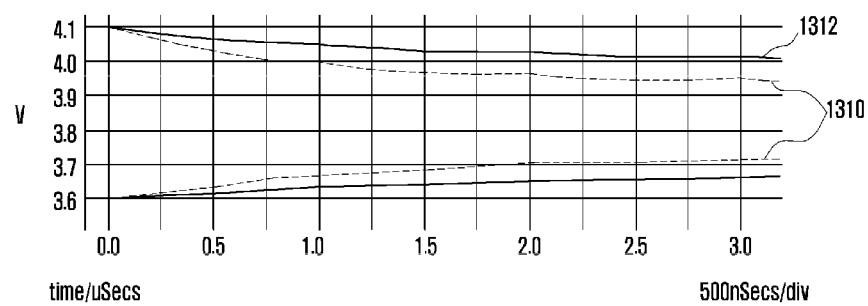
FIG. 13B is a graph illustrating a change in the amount of current with regard to the on-resistance of a transistor, according to an embodiment.
Figure 14:
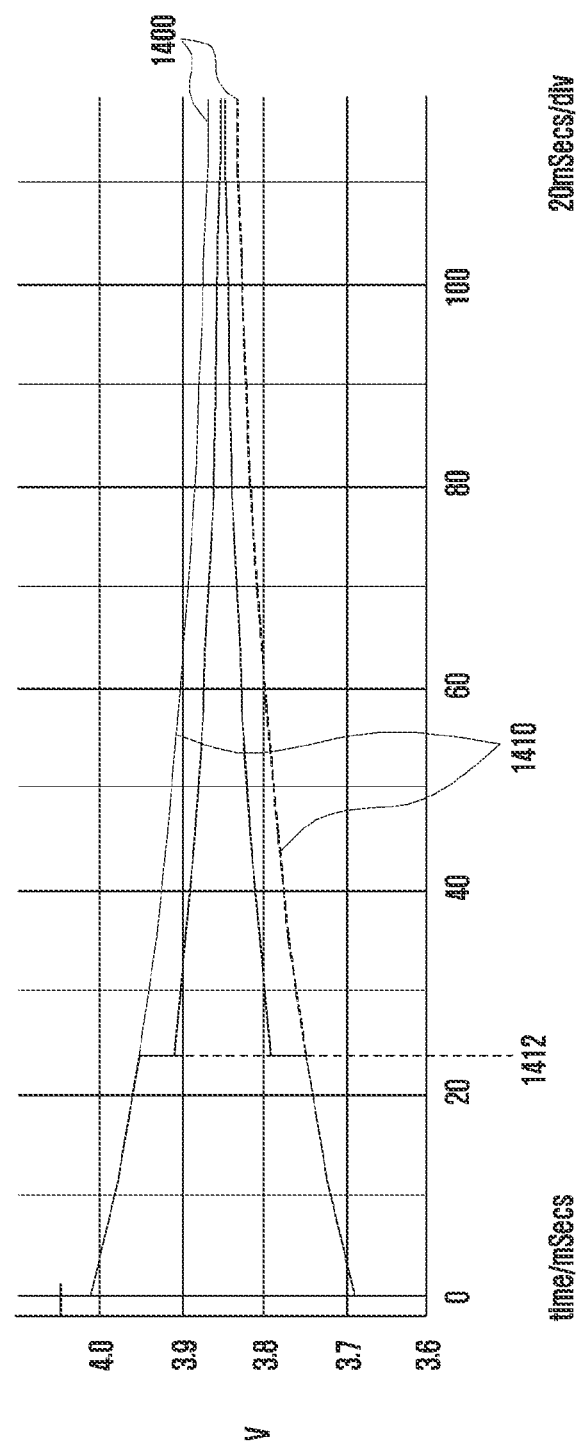
FIG. 14 is a graph illustrating battery balancing with regard to the on-resistance of a transistor, according to an embodiment.

FIG. 12 is a flowchart for a method of configuring an on-resistance of a transistor in connection with an electronic device, according to an embodiment. In the following embodiments, respective operations may be performed successively, but are not necessarily performed successively. The order of respective operations may be changed, and at least two operations may be performed in parallel. The electronic device, in this regard, may be the electronic device 101 in FIG. 1 or the electronic device 201 in FIG. 2A and FIG. 2B. Hereinafter, at least some configurations in FIG. 12 may be described with reference to FIG. 13A, FIG. 13B, and FIG. 14. FIG. 13A is a graph illustrating a change in the amount of current with regard to the on-resistance of a transistor, according to an embodiment. FIG. 13B is a graph illustrating a change in the amount of current with regard to the on-resistance of a transistor, according to an embodiment. FIG. 14 is a graph illustrating cell balancing with regard to the on-resistance of a transistor, according to an embodiment.

Referring to FIG. 12, the electronic device (e.g., the processor 120 in FIG. 1 or the processor or 270 in FIG. 2B) may identify, in operation 1201, whether or not a voltage divider circuit (e.g., the voltage divider circuit 264 in FIG. 2B) has been turned on. The processor 270 may identify whether or not the voltage divider circuit 264 has been turned on, based on the voltage difference between the first battery 252 and the second battery 254.

If the voltage divider circuit is in an turned-off state (e.g., "No" in operation 1201), the electronic device may determine that no ripple current (or inrush current) has occurred.

If the voltage divider circuit is in an turned-on state (e.g., "Yes: in operation 1201), the electronic device may identify, in operation 1203, whether or not the voltage difference between the first battery 252 and the second battery 254 exceeds a sixth reference voltage (e.g., about 200 mV).

If the voltage difference between the batteries exceeds the reference voltage (e.g., about 200 mV) (e.g., "Yes" in operation 1203), the electronic device may determine that the on-resistance of a transistor included in the voltage divider circuit has a first value (e.g., about 25 mΩ) in operation 1205. A voltage difference may exist between the first battery 252 and the second battery 254 if the voltage divider circuit 264 is turned on and thus starts balancing. The peak magnitude ($i_{CP\_peak}$) of the current flowing through the voltage divider circuit 264 may be defined as in Equation 1 below:

$$i_{CP\_peak} = (C_{C1} - V_2)/2 * R_S \qquad \text{Equation (1)}$$

In Equation (1), $V_{C1}$ refers to the voltage of the first battery 252, $V_{C2}$ refers to the voltage of the second battery 254, and $R_S$ may include the on-resistance of the transistor included in the voltage divider circuit 264. Assuming that $V_{C1}$ is 4.1 $V_2$ is 3.6V, the voltage difference between the first battery 252 and the second battery 254 is 500 mV, and $R_S$ is 10 mΩ, the peak value of the magnitude ($i_{CP}$) of the current flowing through the voltage divider circuit 264 may be about 25A (1300), as in FIG. 13A. Assuming that $V_{C1}$ is 4.1V, $V_{C2}$ is 3.6V, the voltage difference between the first battery 252 and the second battery 254 is 500 mV, and $R_S$ is 25 mΩ, the peak value of the magnitude ($i_{CP}$) of the current flowing through the voltage divider circuit 264 may be about 10A (1302), as in FIG. 13A. Accordingly, if the voltage difference between the first battery 252 and the second battery 254 exceeds the reference value (e.g., about 200 mV), the processor 270 may determine that the on-resistance of the voltage divider circuit 264 has a first value (e.g., about 25 mΩ), in order to prevent an overcurrent caused by balancing. If the voltage divider circuit 264 includes sub-divider circuits 460 and 480 configured to have different on-resistances, as in FIG. 4C, a sub-divider circuit (e.g., a third sub-divider circuit 460) configured to have a first value may be used to balance the first battery 252 and the second battery 254. The horizontal axis in FIG. 13A may denote time, and the vertical axis may denote the magnitude of the current (A).

If the voltage difference between the batteries is equal to/lower than the reference voltage (e.g., about 200 mV) (e.g., "Yes" in operation 1203), the electronic device may determine that the on-resistance of the transistor included in the voltage divider circuit has a second value (e.g., about 10 mΩ) in operation 1207. The time necessary to fully balance the batteries and the conversion loss for balancing the batteries may increase in proportion to the on-resistance of the transistor. The time 1312 necessary to fully balance the batteries when the on-resistance of the transistor is configured to have a first value e.g., about 25 mΩ) may increase than the time 1310 necessary to fully balance the batteries when the on-resistance of the transistor is configured to have a second value (e.g., about 10 mΩ), as in FIG. 13B. Accordingly, if the voltage difference between the first battery 252 and the second battery 254 is equal to/lower than the reference voltage, the processor 270 may determine that the on-resistance of the voltage divider circuit 264 has a second value (e.g., about 10 mΩ) in order to improve the battery balancing efficiency (e.g., to shorten the cell balancing time). If the voltage divider circuit 264 includes sub-divider circuits 460 and 480 configured to have different on-resistances, as in FIG. 4C, a sub-divider circuit configured to have a second value may be used to balance the first battery 252 and the second battery 254. The horizontal axis in FIG. 13B may denote time, and the vertical axis may denote the magnitude of the voltage (V).

The electronic device 201 may adaptively configure the on-resistance of the voltage divider circuit 264 based on the voltage difference between the first battery 252 and the second battery 254, similarly to steps 1201 to 1207 in FIG. 12. In this case, the time necessary to fully balance the batteries may be relatively shorter than in the case in which the on-resistance of the voltage divider circuit 264 is maintained at a first value. The processor 270 may change the on-resistance of the transistor included in the voltage divider circuit 264 from the first value to the second value at a first point in time 1412, based on the voltage difference between cells, as in FIG. 14. The time 1410 necessary to fully balance the batteries in the case in which the on-resistance is adaptively determined based on the voltage difference between the first battery 252 and the second battery 254 may be relatively shorter than the time 1400 necessary to fully balance the batteries in the case in which the on-resistance is fixed at the first value. The horizontal axis in FIG. 14 may denote time, and the vertical axis may denote the magnitude of the voltage (V).

According to an embodiment, a method for operating an electronic device (e.g., the electronic device in FIG. 1 or the electronic device 201 in FIG. 2A and FIG. 2B) may include the steps of identifying voltages of a first battery (e.g., the first battery 252 in FIG. 2B) and a second battery (e.g., the second battery 251 in FIG. 2B) connected in series and turning on a voltage divider circuit (e.g., the voltage divider circuit 264 in FIG. 2B) if a voltage difference between the first battery and the second battery satisfies a designated first condition, the voltage divider circuit having a first point connected to the first battery and having a second point, which is different from the first point, connected to a first node on an electric path through which the first battery and the second battery are electrically connected.

The method may further include alternately turning on a pair of a first transistor and a third transistor and a pair of a second transistor and a fourth transistor, which are included in the voltage divider circuit, if the voltage divider circuit is turned on, the voltage divider circuit including multiple transistors connected in series and a capacitor connected to at least some of the multiple transistors.

The method may further include connecting the first battery and the capacitor of the voltage divider circuit if the pair of the first transistor and the third transistor is turned on, and connecting the second battery and the capacitor of the voltage divider circuit if the pair of the second transistor and the fourth transistor is turned on. If the capacitor is connected to one battery having a relatively high voltage between the first battery and the second battery, the capacitor may be charged based on a current provided from the one battery. If the capacitor is connected to the other battery having a relatively low voltage, the capacitor may discharge a current to the other battery.

The method may further include identifying voltages of the first battery and the second battery in a state in which the voltage divider circuit is turned on, and turning on at least a part of the voltage divider circuit if a voltage difference between the first battery and the second battery satisfies a designated second condition.

The step of turning on at least a part may include an operation of turning on at least one of multiple sub-divider circuits included in the voltage divider circuit.

The method may further include identifying voltages of the first battery and the second battery in a state in which at least a part of the voltage divider circuit is turned on, and turning on multiple sub-divider circuits included in the voltage divider circuit if the voltage difference between the first battery and the second battery satisfies a designated third condition different from the designated second condition.

The method may further include identifying voltages of the first battery and the second battery in a state in which at least a part of the voltage divider circuit is turned on, and adjusting a turning-on cycle of the voltage divider circuit if the voltage difference between the first battery and the second battery satisfies a designated fourth condition.

The method may further include identifying voltages of the first battery and the second battery in a state in which the turning-on cycle of the voltage divider circuit is controlled, and turning off the voltage divider circuit if the voltage difference between the first battery and the second battery continuously satisfies the third condition during a reference time.

An electronic device may connect a first battery (e.g., a pack of batteries or a cell of batteries) connected in series and a first point of a voltage divider circuit, and may connect a first node on an electric path, which connects the first battery and a second battery (e.g., a pack of batteries or a cell of batteries), and a second point of the voltage divider circuit, thereby charging/discharging and balancing batteries.

An electronic device has a simplified circuit for controlling the charging/discharging and balancing of multiple batteries connected in series (e.g., a pack of batteries or a cell of batteries), thereby reducing the mounting space of the electronic device, and the capacity and/or type of batteries included in the electronic device may be variously applied.

An electronic device may have a reduced range of charging/discharging power of batteries controlled by a voltage divider circuit, thereby substantially reducing the size and cost of circuits constituting the voltage divider circuit.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
a voltage divider circuit;
a first battery electrically connected to a first point of the voltage divider circuit;
a second battery connected in series to the first battery; and at least one processor, wherein a second point different from the first point of the voltage divider circuit is electrically connected from a first node on a first electric path through which the first battery and the second battery are electrically connected, wherein the at least one processor is configured to: control the voltage divider circuit so as to be turned on in case that a voltage difference between the first battery and the second battery satisfies first reference voltage, and control the voltage divider circuit so as to be turned off in case that the voltage difference between the first battery and the second battery does not satisfy the first reference voltage, and
wherein the at least one processor is further configured to: control at least two of multiple sub-divider circuits included in the voltage divider circuit so as to be turned on, in case that the voltage difference between the first battery and the second battery satisfies a second reference voltage in a state in which the voltage divider circuit is turned on; and
adjust a turning-on cycle of the voltage divider circuit in case that the voltage difference between the first battery and the second battery satisfies a third reference voltage in a state in which at least a part of the voltage divider circuit is turned on.

2. The electronic device of claim 1, further comprising:
a high-voltage charging circuit; and
a low-voltage charging circuit,
wherein the high-voltage charging circuit is electrically connected to a second node on a second electric path through which the first battery and the first point of the voltage divider circuit are electrically connected, and
the low-voltage charging circuit is electrically connected to a third node on a third electric path through which the first node and an internal circuit of the electronic device through the second point of the voltage divider circuit are electrically connected.

3. The electronic device of claim 2, wherein the second battery is charged based on a charging current applied to the first node from the low-voltage charging circuit through the second point of the voltage divider circuit.

4. The electronic device of claim 2, wherein the first battery and the second battery are charged based on a charging current applied to the second node from the high-voltage charging circuit.

5. The electronic device of claim 1, wherein the second battery is configured to supply power to an internal system of the electronic device through the second point of the voltage divider circuit connected to the first node.

6. The electronic device of claim 1, wherein the voltage divider circuit comprises:
a capacitor and multiple transistors connected in series;
a first transistor among the multiple transistors is electrically connected between the second node and a fourth node;
a second transistor among the multiple transistors is electrically connected between the fourth node and the second point of the voltage divider circuit;
a third transistor among the multiple transistors is electrically connected between the second point of the voltage divider circuit and a fifth node; and
a fourth transistor among the multiple transistors is electrically connected between the fifth node and a ground unit,
wherein the capacitor is electrically connected between the fourth node and the fifth node.

7. The electronic device of claim 6, wherein a pair of the first transistor and the third transistor and a pair of the second transistor and the fourth transistor are alternately turned on, in case that the voltage divider circuit is turned on.

8. The electronic device of claim 7, wherein the capacitor is electrically connected to the first battery in case that the pair of the first transistor and the third transistor is turned on, and the capacitor is electrically connected to the second battery in case that the pair of the second transistor and the fourth transistor is turned on.

9. The electronic device of claim 1, wherein the voltage divider circuit comprises a first sub-divider circuit comprising a first transistor having an on-resistance configured to have a first value, and a second sub-divider circuit comprising a second transistor having an on-resistance configured to have a second value; and
the voltage divider circuit is configured such that the first sub-divider circuit is turned on in case that a voltage difference between the first battery and the second battery satisfies a third reference voltage, and the second sub-divider circuit is turned on in case that the voltage difference between the first battery and the second battery does not satisfy the third reference voltage.

10. A method for operating an electronic device, the method comprising: identifying voltages of a first battery and a second battery connected in series; turning on a voltage divider circuit in case that a voltage difference between the first battery and the second battery satisfies a first reference voltage, the voltage divider circuit having a first point connected to the first battery and having a second point which is different from the first point, connected to a first node on an electric path through which the first battery and the second battery are electrically connected;
identifying voltages of the first battery and the second battery in a state in which the voltage divider circuit is turned on; and turning on at least a part of the voltage divider circuit in case that a voltage difference between the first battery and the second battery satisfies a second reference voltage, wherein the voltage divider circuit is turned off in case that the voltage difference between the first battery and the second battery does not satisfy the first reference voltage.

11. The method of claim 10, further comprising alternately turning on a pair of a first transistor and a third transistor and a pair of a second transistor and a fourth transistor, which are included in the voltage divider circuit, in case that the voltage divider circuit is turned on, the voltage divider circuit comprising multiple transistors connected in series and a capacitor connected to at least some of the multiple transistors.

12. The method of claim 11, further comprising:
connecting the first battery and the capacitor of the voltage divider circuit in case that the pair of the first transistor and the third transistor is turned on; and
connecting the second battery and the capacitor of the voltage divider circuit in case that the pair of the second transistor and the fourth transistor is turned on,
wherein, in case that the capacitor is connected to one battery having a relatively high voltage between the first battery and the second battery, the capacitor is charged based on a current provided from the one battery; and
wherein, in case that the capacitor is connected to the other battery having a relatively low voltage, the capacitor discharges a current to the other battery.

13. The method of claim 10, wherein the turning on at least a part comprises turning on at least one of multiple sub-divider circuits included in the voltage divider circuit.

14. The method of claim 13, further comprising: identifying voltages of the first battery and the second battery in a state in which at least a part of the voltage divider circuit is turned on; and turning on multiple sub-divider circuits included in the voltage divider circuit in case that the voltage difference between the first battery and the second battery satisfies third reference voltage different from the second reference voltage.

15. The method of claim 13, further comprising: identifying voltages of the first battery and the second battery in a state in which at least a part of the voltage divider circuit is turned on; and adjusting a turning-on cycle of the voltage divider circuit in case that the voltage difference between the first battery and the second battery satisfies a fourth reference voltage.

16. The method of claim 15, further comprising: identifying voltages of the first battery and the second battery in a state in which the turning-on cycle of the voltage divider circuit is controlled; and turning off the voltage divider circuit in case that the voltage difference between the first battery and the second battery continuously satisfies the third reference voltage during a reference time.

* * * * *